United States Patent
Yako et al.

(10) Patent No.: US 11,696,042 B2
(45) Date of Patent: Jul. 4, 2023

(54) IMAGING APPARATUS

(71) Applicant: Panasonic Intellectual Property Management Co., Ltd., Osaka (JP)

(72) Inventors: Motoki Yako, Osaka (JP); Atsushi Ishikawa, Osaka (JP); Kazuya Hisada, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/814,963

(22) Filed: Jul. 26, 2022

(65) Prior Publication Data
US 2022/0368865 A1 Nov. 17, 2022

Related U.S. Application Data

(63) Continuation of application No. PCT/JP2021/003299, filed on Jan. 29, 2021.

(30) Foreign Application Priority Data

Feb. 28, 2020 (JP) .............................. JP2020-033582

(51) Int. Cl.
*H04N 23/84* (2023.01)
*H04N 23/58* (2023.01)
*H04N 25/13* (2023.01)

(52) U.S. Cl.
CPC ............ *H04N 23/84* (2023.01); *H04N 23/58* (2023.01); *H04N 25/135* (2023.01)

(58) Field of Classification Search
CPC ...... H04N 23/84; H04N 23/58; H04N 25/135; H04N 23/957; G01J 3/2823; G01J 3/02; G01J 3/51
See application file for complete search history.

(56) References Cited

U.S. PATENT DOCUMENTS 3,580,149 A * 5/1971 Fujisawa ................ G03B 17/12
356/225
6,977,365 B1 * 12/2005 Wynn ..................... G01N 21/27
356/416

(Continued)

FOREIGN PATENT DOCUMENTS

JP 1-063149 U 4/1989
JP 2013-072771 4/2013

(Continued)

OTHER PUBLICATIONS

International Search Report of PCT application No. PCT/JP2021/003299 dated Apr. 13, 2021.

*Primary Examiner* — Chiawei Chen
(74) *Attorney, Agent, or Firm* — Wenderoth, Lind & Ponack, L.L.P.

(57) ABSTRACT

An imaging apparatus includes an image sensor, a filter array disposed on an optical path from a target object to the image sensor and including two-dimensionally-arranged optical filters, and a processing circuit that generates at least four pieces of spectral image data based on an image acquired by the image sensor. The optical filters include various types of optical filters with different spectral transmittance. Each of the at least four pieces of spectral image data indicates an image corresponding to one of at least four wavelength bands. The filter array includes at least one characteristic section. The processing circuit detects a relative position between the filter array and the image sensor based on the at least one characteristic section in the image acquired by the image sensor, and compensates for deviation between the relative position and a preliminarily-set relative position when the processing circuit detects the deviation.

15 Claims, 22 Drawing Sheets

(56) References Cited

U.S. PATENT DOCUMENTS

| | | | | |
|---|---|---|---|---|
| 2002/0135770 | A1* | 9/2002 | Lewis | G01J 3/26 |
| | | | | 356/419 |
| 2005/0134854 | A1* | 6/2005 | Aguirre | G01J 3/51 |
| | | | | 356/419 |
| 2008/0030803 | A1* | 2/2008 | Min | H04N 1/02805 |
| | | | | 358/483 |
| 2010/0245650 | A1* | 9/2010 | Kreysar | G01J 3/0218 |
| | | | | 348/311 |
| 2013/0077176 | A1 | 3/2013 | Ohtomo et al. | |
| 2015/0334357 | A1* | 11/2015 | Wang | H04N 25/135 |
| | | | | 348/278 |
| 2016/0138975 | A1 | 5/2016 | Ando et al. | |
| 2018/0288292 | A1* | 10/2018 | Moggridge | G01J 3/0205 |
| 2019/0182440 | A1* | 6/2019 | Xin | G01J 3/51 |

FOREIGN PATENT DOCUMENTS

| | | |
|---|---|---|
| JP | 2013-162492 | 8/2013 |
| JP | 2016-156801 | 9/2016 |
| JP | 2018-057041 | 4/2018 |

* cited by examiner

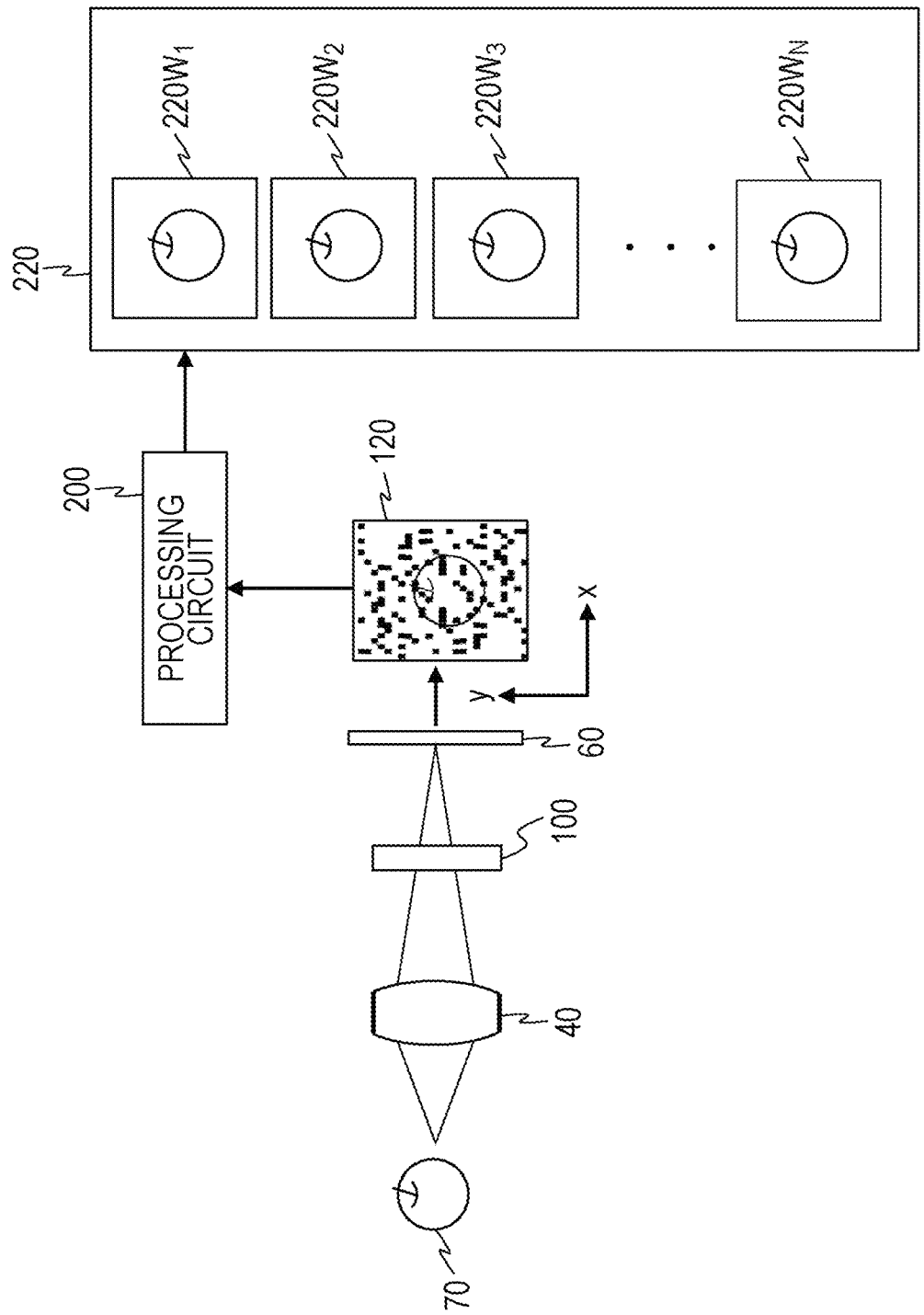

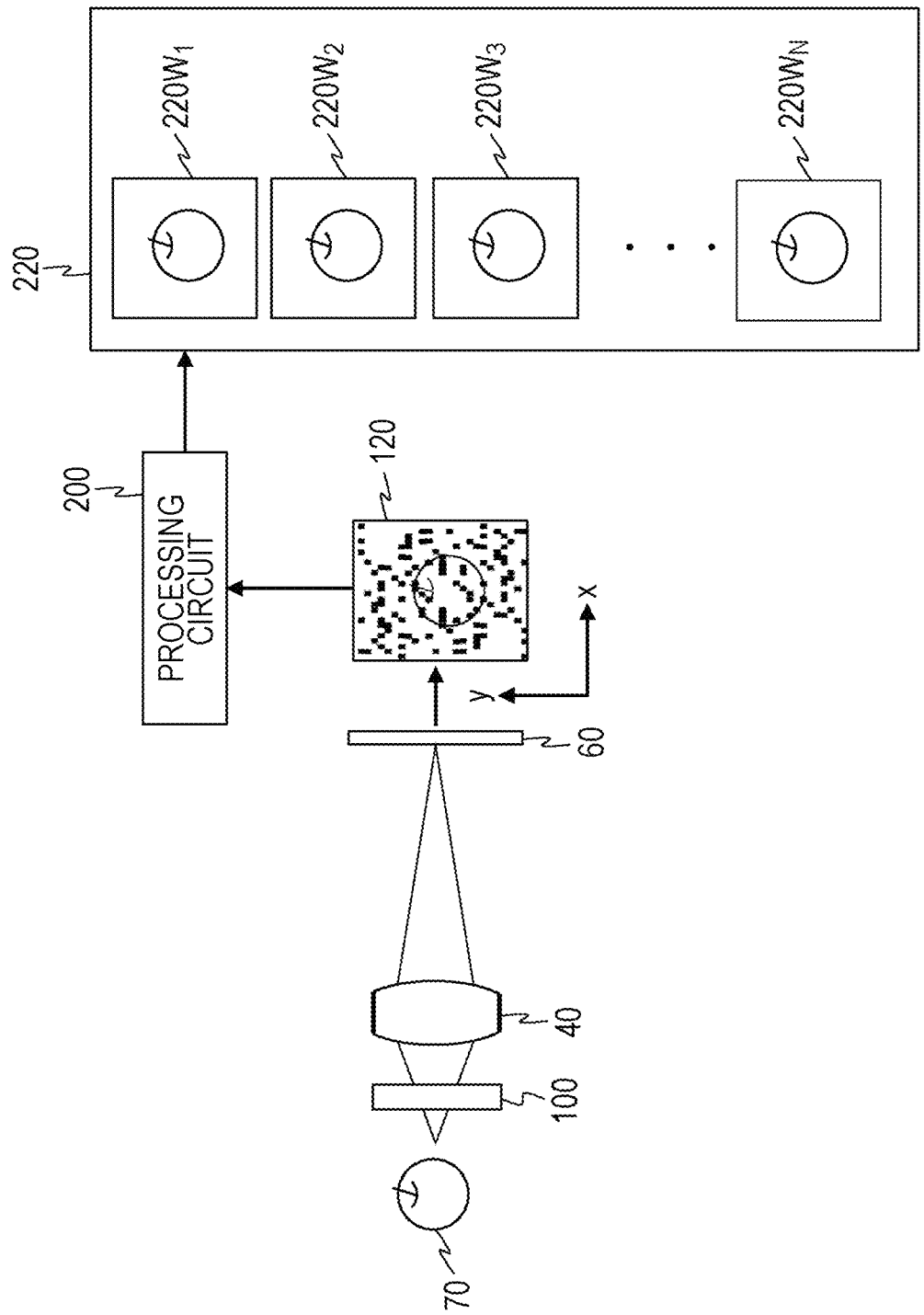

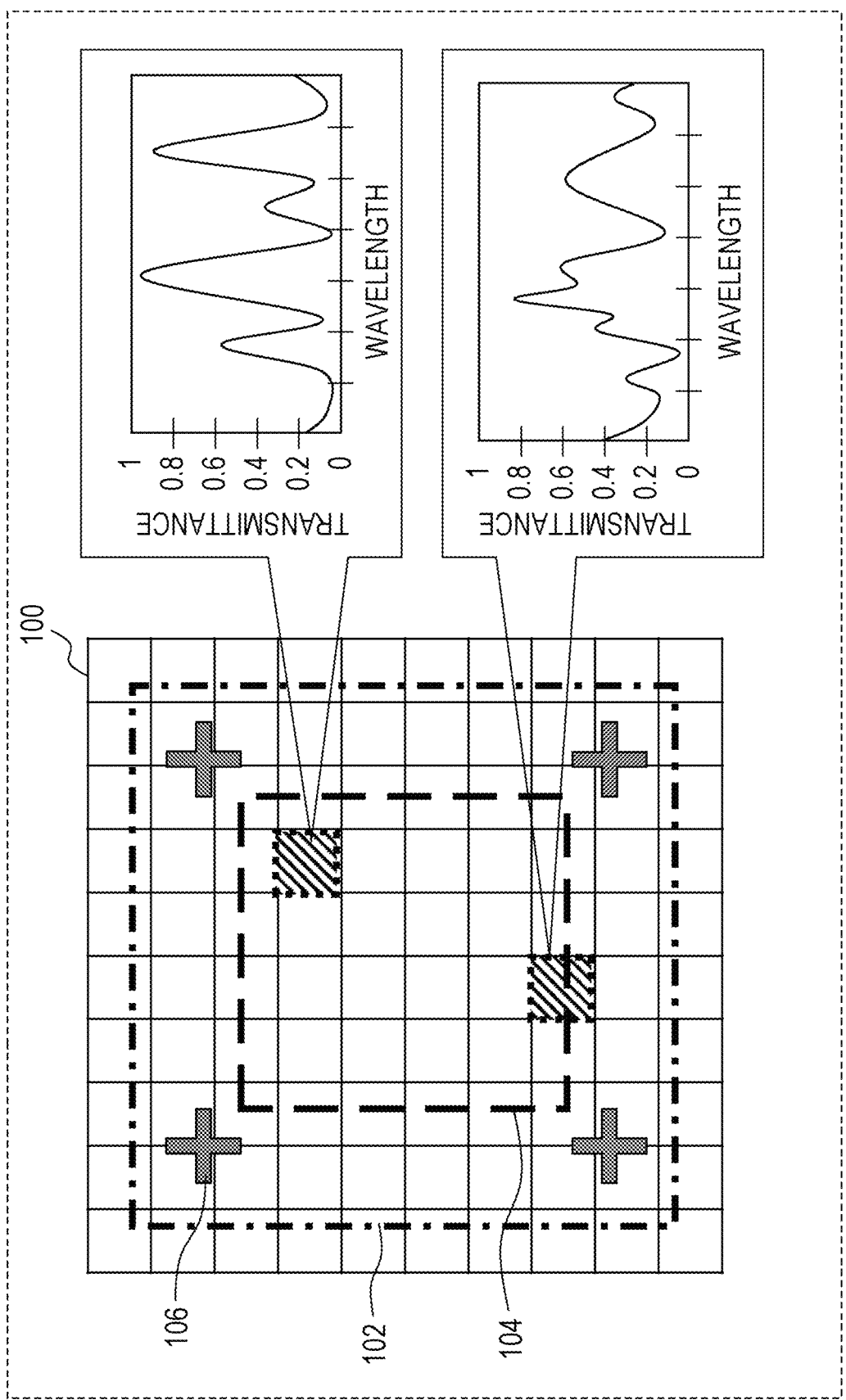

IMAGING APPARATUS

BACKGROUND

1. Technical Field

The present disclosure relates to imaging apparatuses.

2. Description of the Related Art

By utilizing spectral information about a large number of wavelength bands, such as several tens of bands, each being a narrow band, detailed characteristics of a target object can be ascertained, which is not possible with a conventional RGB image. A camera that acquires such multi-wavelength information is called a "hyperspectral camera" Hyperspectral cameras are used in various fields, such as in food inspection, biological examination, drug development, and mineral component analysis.

U.S. Pat. No. 9,599,511 discloses an example of a hyperspectral imaging apparatus that utilizes compressed sensing. This imaging apparatus includes an encoder as an array of optical filters with different wavelength dependency with respect to light transmittance, an image sensor that detects light transmitted through the encoder, and a signal processing circuit. The encoder is disposed on an optical path that connects a subject and the image sensor. For each pixel, the image sensor simultaneously detects light on which components of wavelength bands are superimposed, so as to acquire a single wavelength-multiplexed image. The signal processing circuit utilizes information about the spatial distribution of spectral transmittance of the encoder so as to apply compressed sensing to the acquired wavelength-multiplexed image, thereby generating image data for each wavelength band in a reconstruction process.

SUMMARY

One non-limiting and exemplary embodiment provides a technique for reducing an error occurring when images of wavelength bands are generated in a reconstruction process.

In one general aspect, the techniques disclosed here feature an imaging apparatus including an image sensor, a filter array that is disposed on an optical path from a target object to the image sensor and that includes two-dimensionally-arranged optical filters, and a processing circuit that generates at least four pieces of spectral image data based on an image acquired by the image sensor. The optical filters include various types of optical filters with different spectral transmittance. Each of the at least four pieces of spectral image data indicates an image corresponding to one wavelength band of at least four wavelength bands. The filter array includes at least one characteristic section. The processing circuit detects a relative position between the filter array and the image sensor based on the at least one characteristic section in the image acquired by the image sensor, and compensates for deviation between the relative position and a preliminarily-set relative position when the processing circuit detects the deviation.

According to an aspect of the present disclosure, an error occurring when images of wavelength bands are generated in a reconstruction process can be reduced.

General or specific aspects of the present disclosure may be implemented as a system, a device, a method, an integrated circuit, a computer program, or a storage medium, such as a computer-readable storage disk, or may be implemented as a freely-chosen combination of a system, a device, a method, an integrated circuit, a computer program, and a storage medium. The computer-readable storage medium may include a nonvolatile storage medium, such as a CD-ROM (compact disc-read only memory). The device may be constituted of one or more devices. If the device is constituted of two or more devices, the two or more devices may be disposed within a single apparatus, or may be disposed separately within two or more separate apparatuses. In this description and the claims, the term "device" may refer not only to a single device but also to a system formed of devices.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1A schematically illustrates an exemplary imaging apparatus;

FIG. 1B illustrates another configuration example of the imaging apparatus;

FIG. 6A is a diagram for explaining a filter array according to the first embodiment;

DETAILED DESCRIPTIONS

Figure 1C:
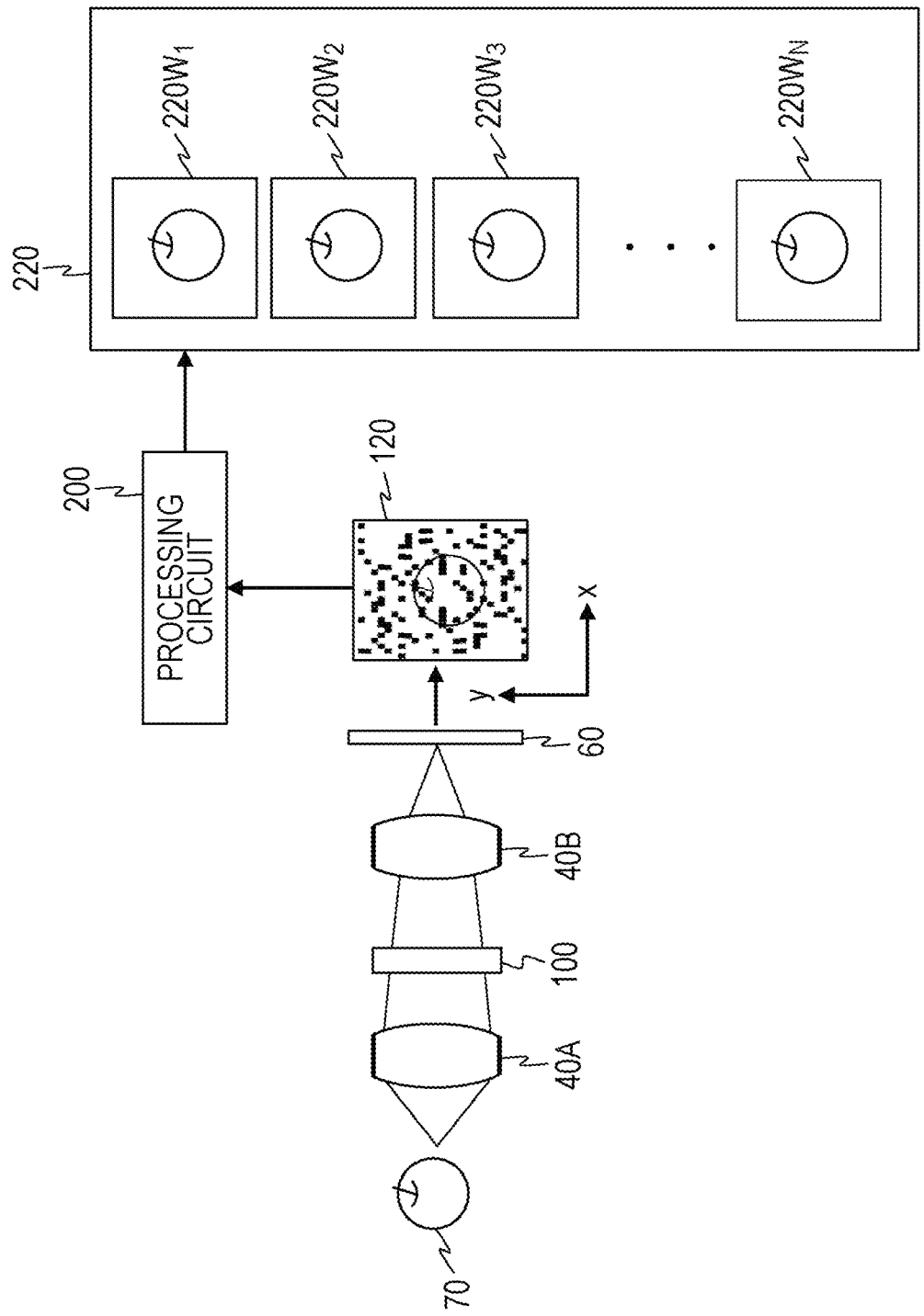
FIG. 1C illustrates another configuration example of the imaging apparatus.

Embodiments to be described below indicate general or specific examples. Numerical values, shapes, materials, components, positions and connection methods of the components, steps, and the sequence of the steps are examples and are not intended to limit the technology of the present disclosure. Of the components in the following embodiments, a component not defined in the independent claim indicating the most generic concept is described as a freely-chosen component. The drawings are not necessarily exact illustrations. Furthermore, in the drawings, same reference signs are given to substantially identical or similar components. Redundant descriptions may sometimes be omitted or simplified.

In the present disclosure, each circuit, unit, device, member, or section or each functional block in each block diagram may entirely or partially be implemented by, for example, one or more electronic circuits containing a semiconductor device, semiconductor IC (integrated circuit), or LSI (large scale integration). The LSI or the IC may be integrated in a single chip or may be configured by combining chips. For example, the functional blocks excluding storage elements may be integrated in a single chip. Although the terms "LSI" and "IC" are used here, the terms used may change depending on the degree of integration, such that so-called "system LSI", "VLSI" (very large scale integration), or "ULSI" (ultra large scale integration) may be used. A field programmable gate array (FPGA) to be programmed after the LSI is manufactured, or a reconfigurable logic device that can reconfigure the connection relationship inside the LSI or can set up the circuit sections inside the LSI can also be used for the same purpose.

Furthermore, the function or operation of each circuit, unit, device, member, or section may entirely or partially be implemented by software processing. In this case, the software is stored in a non-transitory storage medium, such as one or more ROM (read-only memory) units, an optical disk, or a hard disk drive. When the software is executed by a processor, a function specified by the software is implemented by the processor and a peripheral device. A system or a device may include one or more non-transitory storage media storing the software, a processor, and a required hardware device, such as an interface.

A configuration example of a hyperspectral imaging apparatus according to an embodiment of the present disclosure and the knowledge discovered by the present inventors will now be described.

FIG. 1A schematically illustrates an exemplary imaging apparatus. This imaging apparatus includes components similar to those of the imaging apparatus disclosed in U.S. Pat. No. 9,599,511. The imaging apparatus includes an optical system 40, a filter array 100, an image sensor 60, and a processing circuit 200. The filter array 100 has a structure and a function similar to those of the "encoder" disclosed in U.S. Pat. No. 9,599,511. The optical system 40 and the filter array 100 are disposed on an optical path of light incident from a target object 70 serving as a subject. The filter array 100 is disposed at a position located between the optical system 40 and the image sensor 60 and away from the image sensor 60. In FIG. 1A, an apple is illustrated as an example of the target object 70. The target object 70 is not limited to an apple and may be a freely-chosen object. Based on image data generated by the image sensor 60, the processing circuit 200 generates spectral image data with respect to each of wavelength bands included in a specific wavelength range (also referred to as "target wavelength range" hereinafter) serving as a detection target. In the following description, the spectral image data to be generated with respect to the wavelength bands will be referred to as spectral images $220W_1$, $220W_2$, ..., and $220W_N$, and these spectral images will collectively be referred to as spectral images 220. In this description, a signal indicating an image (i.e., a group of signals indicating pixel values of pixels) may sometimes be simply referred to as "image".

The filter array 100 is an array of translucent filters arranged in rows and columns. The filters include various types of filters with different spectral transmittance, that is, different wavelength dependency with respect to light transmittance. The filter array 100 modulates the intensity of incident light for each wavelength before outputting the light. This process performed by the filter array 100 is referred to as "encoding" in this description.

The image sensor 60 is a monochrome-type light detector having two-dimensionally-arranged light detection elements (also referred to as "pixels" in this description). The image sensor 60 may be, for example, a CCD (charge-coupled device) sensor or a CMOS (complementary metal oxide semiconductor) sensor.

Based on an image 120 acquired by the image sensor 60, the processing circuit 200 generates data of the spectral images $220W_1$, $220W_2$, ..., and $220W_N$ containing information about the respective wavelength bands.

FIGS. 1B and 1C illustrate other configuration examples of the imaging apparatus. In the example in FIG. 1B, the filter array 100 is disposed between the target object 70 and the optical system 40. In the example in FIG. 1C, the imaging apparatus includes two optical systems 40A and 40B, and the filter array 100 is disposed therebetween. As in these examples, an optical system may be disposed between the filter array 100 and the image sensor 60.

Figure 2A:
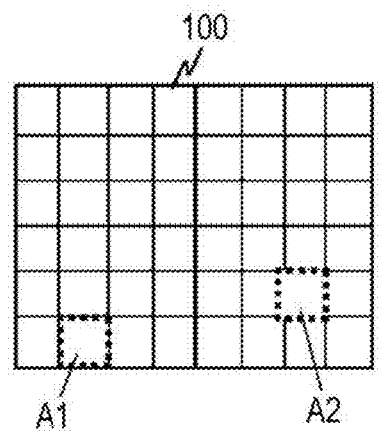
FIG. 2A schematically illustrates an example of a filter array.

FIG. 2A schematically illustrates an example of the filter array 100. The filter array 100 has two-dimensionally-arranged regions. In this description, each of these regions may sometimes be referred to as "cell". In each region, an optical filter having individually-set spectral transmittance is disposed. The spectral transmittance is expressed as a function $T(\lambda)$, where $\lambda$ denotes the wavelength of incident light. The spectral transmittance $T(\lambda)$ may have a value greater than or equal to 0 and less than or equal to 1.

In the example illustrated in FIG. 2A, the filter array 100 has 48 rectangular regions arranged in a 6 row by 8 column matrix. This is merely an example, and a larger number of regions may be set in an actual application. For example, the number may be about the same as the number of pixels in the image sensor 60. The number of filters included in the filter array 100 is set in accordance with the intended usage within a range of, for example, several tens to several thousands of filters.

Figure 2B:
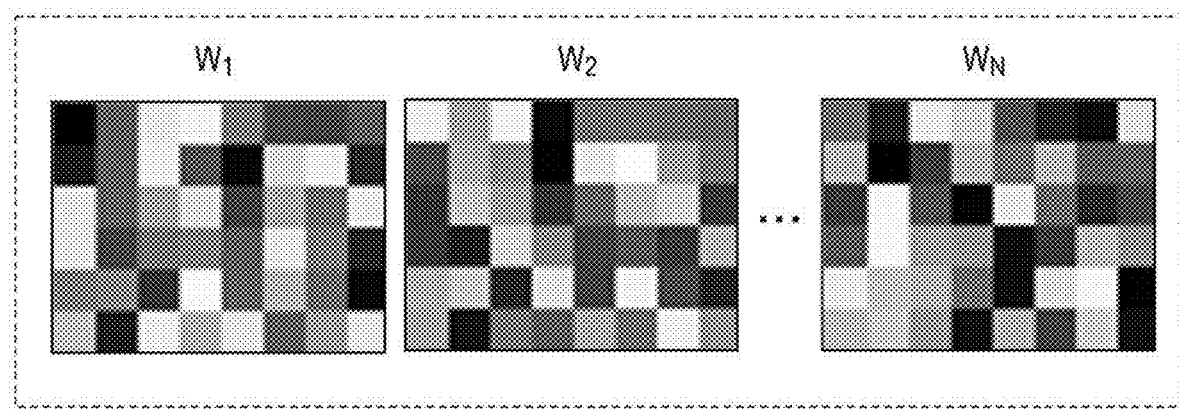
FIG. 2B illustrates an example of a spatial distribution of light transmittance for each of wavelength bands included in a target wavelength range.

FIG. 2B illustrates an example of a spatial distribution of light transmittance for each of wavelength bands $W_1$, $W_2$, . . . , and $W_N$ included in the target wavelength range. In the example illustrated in FIG. 2B, the differences in the gradation levels of the regions indicate differences in transmittance. A paler region has higher transmittance, whereas a darker region has lower transmittance. As illustrated in FIG. 2B, the spatial distribution of the light transmittance varies from wavelength band to wavelength band.

Figure 2C:
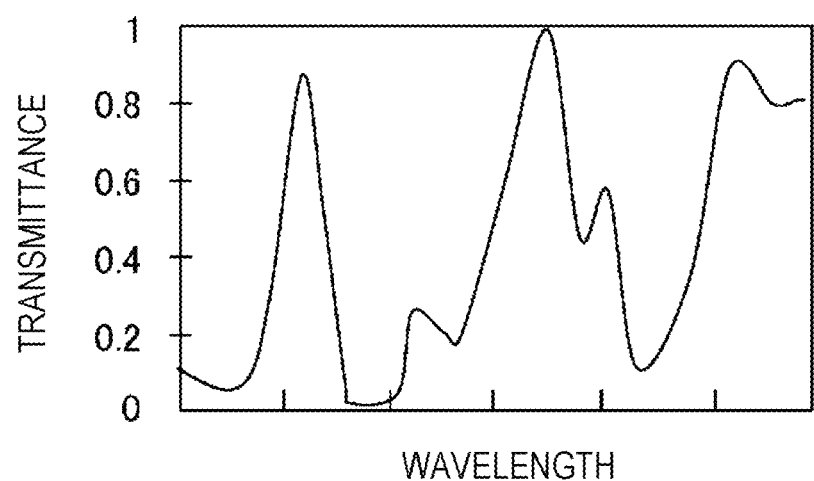
FIG. 2C illustrates an example of spectral transmittance of a region A1 included in the filter array illustrated in FIG. 2A.
Figure 2D:
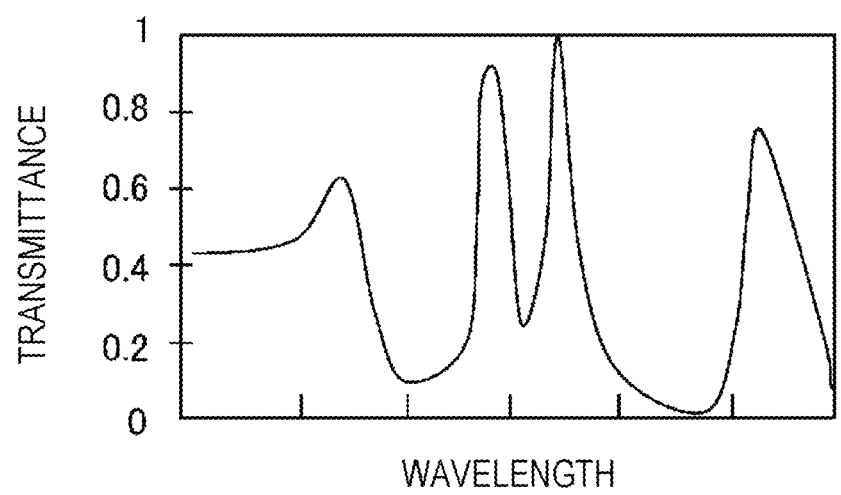
FIG. 2D illustrates an example of spectral transmittance of a region A2 included in the filter array illustrated in FIG. 2A.

FIGS. 2C and 2D illustrate examples of spectral transmittance of a region A1 and a region A2, respectively, included in the filter array 100 illustrated in FIG. 2A. The spectral transmittance of the region A1 and the spectral transmittance of the region A2 are different from each other. Accordingly, the spectral transmittance of the filter array 100 varies from region to region. However, not all the regions need to have different spectral transmittance. In the filter array 100, at least some of the regions have different spectral transmittance. The filter array 100 includes two or more filters having different spectral transmittance. In one example, the number of spectral transmittance patterns of the regions included in the filter array 100 may be equal to or greater than the number N of wavelength bands included in the target wavelength range. The filter array 100 may be designed such that at least half of the regions have different spectral transmittance.

Figure 3A:
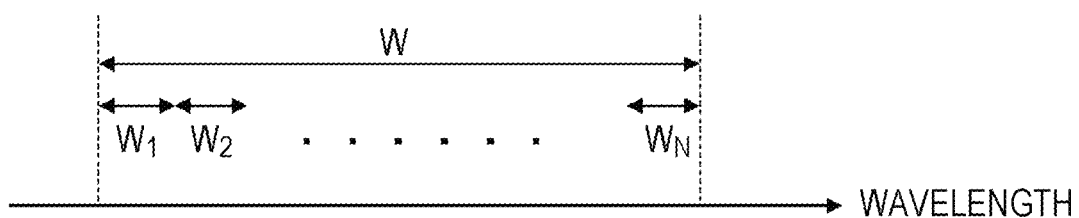
FIG. 3A is a diagram for explaining the relationship between the target wavelength range and the wavelength bands included therein.
Figure 3B:
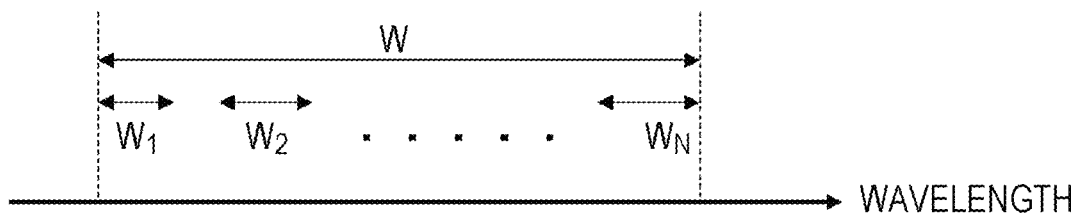
FIG. 3B is a diagram for explaining the relationship between the target wavelength range and the wavelength bands included therein.

FIGS. 3A and 3B are diagrams for explaining the relationship between a target wavelength range W and the wavelength bands $W_1$, $W_2$, . . . , and $W_N$ included therein. The target wavelength range W may be set to any of various ranges in accordance with the intended usage. For example, the target wavelength range W may be a visible-light wavelength range from approximately 400 nm to approximately 700 nm, a near-infrared wavelength range from approximately 700 nm to approximately 2500 nm, or a near-ultraviolet wavelength range from approximately 10 nm to approximately 400 nm. Alternatively, the target wavelength range W may be a radio-wave range, such as a mid-infrared, far-infrared, terahertz-wave, or millimeter-wave range. Accordingly, the wavelength range to be used is not limited to a visible-light range. In this description, nonvisible light, such as a near-ultraviolet ray, a near-infrared ray, and a radio wave, in addition to visible light, will be referred to as "light" for the sake of convenience.

In the example illustrated in FIG. 3A, the target wavelength range W is equally divided by N into wavelength bands $W_1$, $W_2$, . . . , and $W_N$, where N denotes a freely-chosen integer greater than or equal to 4. However, the example is not limited to this. The wavelength bands included in the target wavelength range W may be set arbitrarily. For example, the bandwidths may be nonuniform among the wavelength bands. There may be a gap or an overlap between neighboring wavelength bands. In the example illustrated in FIG. 3B, the bandwidth varies from wavelength band to wavelength band, and a gap exists between two neighboring wavelength bands. Accordingly, the wavelength bands may be different from each other, and may be set arbitrarily.

Figure 4A:
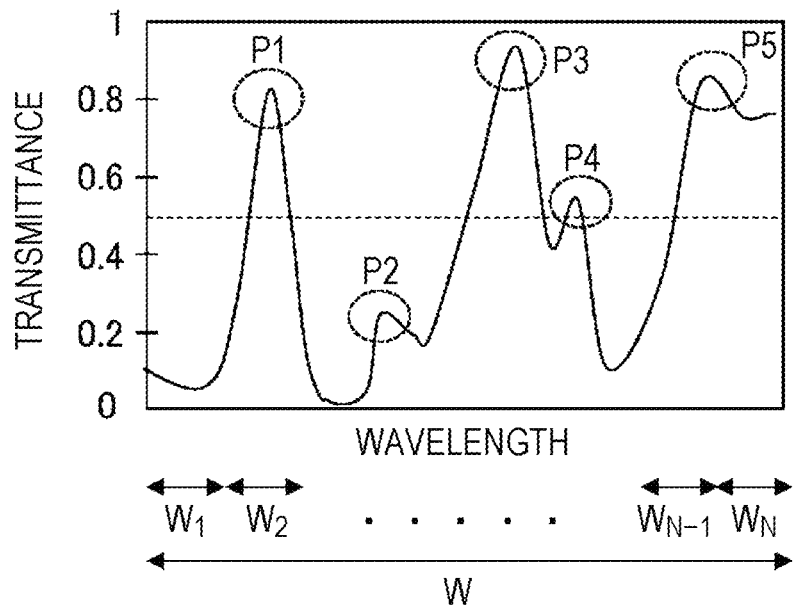
FIG. 4A is a diagram for explaining the characteristic of spectral transmittance in a certain region of the filter array.

FIG. 4A is a diagram for explaining the characteristic of spectral transmittance in a certain region of the filter array 100. In the example illustrated in FIG. 4A, the spectral transmittance has maximum values P1 to P5 and minimum values with respect to wavelengths within the target wavelength range W. In the example illustrated in FIG. 4A, the light transmittance within the target wavelength range W is normalized such that the maximum value thereof is 1 and the minimum value thereof is 0. In the example illustrated in FIG. 4A, the spectral transmittance has maximum values in wavelength bands, such as the wavelength band $W_2$ and a wavelength band $W_{N-1}$. Accordingly, in this embodiment, the spectral transmittance in each region has maximum values in wavelength bands among the wavelength bands $W_1$ to $W_N$. In the example in FIG. 4A, the maximum value P1, the maximum value P3, the maximum value P4, and the maximum value P5 are greater than or equal to 0.5.

Accordingly, the light transmittance in each region varies from wavelength to wavelength. Therefore, the filter array 100 transmits a large amount of incident light in certain wavelength bands and does not transmit much of the incident light in other wavelength bands. For example, the transmittance with respect to light in k wavelength bands among the N wavelength bands may be higher than 0.5, whereas the transmittance with respect to light in the remaining (N−k) wavelength bands may be lower than 0.5. In this case, k denotes an integer satisfying 2≤k<N. Supposing that the incident light is white light uniformly containing all wavelength components of visible light, the filter array 100 modulates the incident light into light having discrete intensity peaks with respect to the wavelengths for each region, superimposes the multi-wavelength light, and outputs the light.

Figure 4B:
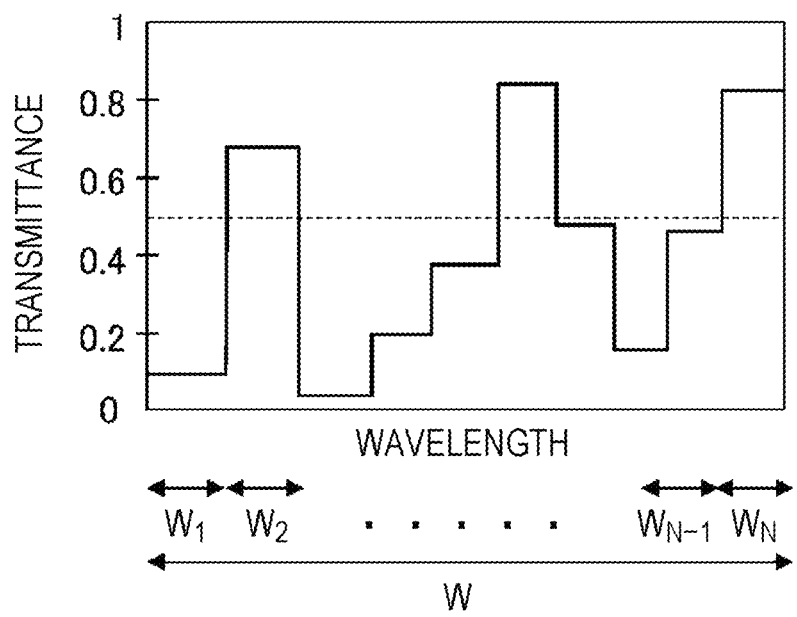
FIG. 4B illustrates an example of a result obtained by averaging the spectral transmittance illustrated in FIG. 4A for each of the wavelength bands.

FIG. 4B illustrates an example of a result obtained by averaging the spectral transmittance illustrated in FIG. 4A for each of the wavelength bands $W_1$, $W_2$, . . . , and $W_N$. Averaged transmittance is obtained by integrating the spectral transmittance $T(\lambda)$ for each wavelength band and dividing the integral value by the bandwidth of the wavelength band. In this description, a transmittance value averaged for each wavelength band in this manner will be referred to as transmittance in that wavelength band. In this example, transmittance is outstandingly high in the three wavelength bands having the maximum values P1, P3, and P5. In particular, the transmittance exceeds 0.8 in the two wavelength bands having the maximum values P3 and P5.

In the examples illustrated in FIGS. 2A to 2D, a gray-scale transmittance distribution in which the transmittance in each region may be a freely-chosen value that is greater than or equal to 0 and less than or equal to 1 is assumed. However, such a gray-scale transmittance distribution is not necessarily essential. For example, a binary-scale transmittance distribution in which the transmittance in each region may have a value of either substantially 0 or substantially 1 may be employed. In the binary-scale transmittance distribution, each region transmits a large portion of light in at least two wavelength bands of the wavelength bands included in the target wavelength range, and does not transmit a large portion of light in the remaining wavelength bands. The expression "large portion" refers to substantially 80% or more.

Of all the cells, some of them, such as half of the cells, may be replaced with transparent regions. Such transparent regions transmit light in all the wavelength bands $W_1$ to $W_N$ included in the target wavelength range with about the same high transmittance, such as 80% or higher. In such a configuration, the transparent regions may be arranged in, for example, a checkboard pattern. In other words, in two arrangement directions of the regions in the filter array 100, regions with different light transmittance in accordance with wavelengths and transparent regions may be alternately arranged.

Such data indicating the spatial distribution of the spectral transmittance of the filter array 100 is preliminarily acquired based on design data or actual measurement calibration, and is stored in a storage medium included in the processing circuit 200. The data is used in a computing process to be described later.

The filter array 100 may be constituted by using, for example, a multilayer film, an organic material, a diffraction grating structure, or a metal-containing micro-structure. In a case where a multilayer film is to be used, for example, a dielectric multilayer film or a multilayer film including a metallic layer may be used. In this case, the filter array 100 may be formed such that at least one of the thickness, the material, and the stacked order of each multilayer film varies for each cell. Accordingly, spectral characteristics that vary from cell to cell can be realized. By using a multilayer film, a sharp rise and fall of the spectral transmittance can be realized. A configuration that uses an organic material may be realized by varying a contained pigment or dye from cell to cell, or by stacking different types of materials. A configuration that uses a diffraction grating structure may be realized by providing a diffracting structure with a diffraction pitch or depth that varies from cell to cell. In a case where a metal-containing micro-structure is to be used, the filter array 100 may be fabricated by utilizing spectroscopy based on a plasmon effect.

Next, an example of signal processing performed by the processing circuit 200 will be described. The processing circuit 200 generates multi-wavelength spectral images 220 in a reconstruction process based on the image 120 output from the image sensor 60 and the spatial-distribution characteristic of the transmittance of the filter array 100 for each wavelength. The term "multi-wavelength" refers to, for example, wavelength bands larger in number than the three color wavelength bands of RGB acquired by a normal color camera. The number of wavelength bands may be, for example, four to about 100. The number of wavelength bands will be referred to as "the number of bands". Depending on the intended usage, the number of bands may exceed 100.

Data to be desirably obtained is a spectral image 220, and the data is expressed as f. Assuming that the number of bands is defined as N, f is data obtained by integrating image data $f_1, f_2, \ldots,$ and $f_N$ of the respective bands. As illustrated in FIG. 1A, the horizontal direction of an image is defined as an x direction, and the vertical direction of an image is defined as a y direction. Assuming that the number of pixels in the x direction of image data to be obtained is defined as n and the number of pixels in the y direction is defined as m, each piece of image data $f_1, f_2, \ldots,$ and $f_N$ is a group of two-dimensional data with n×m pixels. Therefore, data f is three-dimensional data with n×m×N elements. On the other hand, the number of elements in data g of the image 120 acquired by being encoded and multiplexed by the filter array 100 is n×m. The data g can be expressed using Expression (1) indicated below:

$$g = Hf = H \begin{bmatrix} f_1 \\ f_2 \\ \vdots \\ f_W \end{bmatrix} \quad (1)$$

In this case, $f_1, f_2, \ldots,$ and $f_N$ each denote data having n×m elements. Therefore, a vector at the right-hand side is strictly a one-dimensional vector of n×m×N rows and one column. A vector g is expressed and calculated by being converted into a one-dimensional vector of n×m rows and one column. A matrix H expresses a transform involving encoding and intensity-modulating components $f_1, f_2, \ldots,$ and $f_N$ of a vector f with encoding information that varies for each wavelength band and adding the components together. Therefore, H is a matrix of n×m rows and n×m×N columns. In this description, the matrix H may sometimes be referred to as "system matrix".

If the vector g and the matrix H are given, it appears as if f can be calculated by solving an inverse problem of Expression (1). However, since the number of elements n×m×N in the data f to be obtained is greater than the number of elements n×m in the acquisition data g, this problem is an ill-posed problem and cannot be solved as is. The processing circuit 200 utilizes the redundancy of the image included in the data f to obtain a solution by using a compressed sensing technique. In detail, the data f to be obtained is estimated by solving Expression (2) indicated below:

$$f' = \arg\min_{f} \left\{ \|g - Hf\|_{l_2} + \tau \Phi(f) \right\} \quad (2)$$

In this case, f' denotes data of estimated f. The first term in the parentheses in the above expression indicates an amount of deviation, that is, a so-called residual term, between an estimation result Hf and the acquisition data g. Although a square sum is set as the residual term here, an absolute value or a root-sum-square value may be set as the residual term. The second term in the parentheses is a regularization term or a stabilization term. Expression (2) involves determining f that minimizes the sum of the first term and the second term. The processing circuit 200 can converge on solution in accordance with a recursive iterative operation so as to ultimately calculate a solution f.

The first term within the parentheses in Expression (2) indicates a computing process involving determining a square sum of a difference between the acquisition data g and Hf obtained by performing a conversion on f in the estimation process using the matrix H. In the second term, Φ(f) denotes a limiting condition in the regularization of f, and is a function having sparse information of the estimation data reflected therein. This function brings about an advantage of making the estimation data smooth or stable. The regularization term may be expressed by, for example, a discrete cosine transform (DCT) of f, a wavelet transform, a Fourier transform, or a total variation (TV). For example, if a total variation is used, stable estimation data in which the effect of noise in the observation data g is reduced can be acquired. The sparse characteristics of the target object 70 in the space of each regularization term vary depending on the texture of the target object 70. A regularization term in which the texture of the target object 70 becomes sparser in the space of the regularization term may be selected. Alternatively, regularization terms may be included in the computing process. τ denotes a weighting factor. The larger the weighting factor τ, the amount of cutback of redundant data increases, thus increasing the percentage to be compressed. The smaller the weighting factor τ, the weaker the convergence to the solution. The weighting factor τ is set to an appropriate value at which f converges to a certain extent and that does not lead to over-compression.

In the configurations in FIGS. 1A to 1C, an image encoded by the filter array 100 is acquired in a blurry state on the imaging surface of the image sensor 60. Therefore, by preliminarily storing this blurriness information and reflecting this blurriness information on the aforementioned system matrix H, spectral images 220 can be generated in a reconstruction process. The blurriness information can be expressed by a point spread function (PSF). A PSF is a function that defines the degree of spreading of a point image toward surrounding pixels. For example, if a point image corresponding to one pixel in an image spreads to a k×k pixel region surrounding the pixel due to blurriness, the PSF may be defined as a coefficient group, that is, a matrix, indicating an effect on the brightness of the pixels within the region. By reflecting the effect of blurriness of the encoding pattern by the PSF on the system matrix H, spectral images 220 can be generated in a reconstruction process. Although the filter array 100 may be disposed at a freely-chosen position, a position where the encoding pattern of the filter array 100 does not spread too much and disappear may be selected.

In the above configuration, the processing circuit 200 generates a spectral image 220 for each wavelength band with respect to a region equal in size to or smaller than a region image-captured by the image sensor 60. In order to acquire an accurate spectral image 220, it is desirable that data indicating the spatial distribution of the spectral transmittance of the filter array 100 (e.g., information about the aforementioned matrix H) be accurately set in advance. The data indicating the spatial distribution of the spectral transmittance of the filter array 100 may be set in accordance with a test performed at the time of a designing process or a manufacturing process. The test involves using a light source that outputs light with a wavelength belonging to each wavelength band to radiate the light from behind the filter array 100 and measuring the intensity of light transmitted therethrough. The set data indicating the spatial distribution of the spectral transmittance is preliminarily stored in the storage medium of the processing circuit 200.

In order to generate images for the respective wavelength bands in this manner, it is important that the spatial distribution of the spectral transmittance of the filter array 100 be accurately ascertained. If the above-described computing process is performed in a state where the spatial distribution of the spectral transmittance of the filter array 100 is incorrect, false spectral images are generated. In other words, an incorrect spatial distribution of the spectral transmittance leads to a significant decrease in the spectral resolution.

This problem is notable especially in a configuration where the filter array 100 is detachable from and attachable to the imaging apparatus. If the type of target object 70 or the wavelength band of interest changes, the characteristics of an optimal filter array 100 also change. If the filter array 100 is replaceable, an optimal filter array 100 can be selected and attached in accordance with the target object 70 or the intended usage. In that case, the data indicating the spatial distribution of the spectral transmittance is preliminarily set for each filter array 100 and is stored in the storage medium.

However, in the case where the filter array 100 is detachable, the relative position between the filter array 100 and the image sensor 60 may possibly deviate from a preliminarily-set relative position. When such deviation occurs, the spatial distribution of the spectral transmittance of the filter array 100 as viewed from the image sensor 60 changes even if the same filter array 100 is used. In particular, in a case where the filters in the filter array 100 are arranged in a random pattern or in a pattern close to a random pattern, the spatial distribution of the spectral transmittance may become completely different when deviation of the relative position occurs. For example, if the relative position between the filter array 100 and the image sensor 60 changes by an amount equivalent to one pixel in the image sensor 60, the spatial distribution of the spectral transmittance of the filter array 100 as viewed from the image sensor 60 changes by the amount equivalent to one pixel. In the case where the filter array 100 has a random array or an array close to a random array, the filters displaced by the amount equivalent to one pixel may have spectral transmittance completely different from the original spectral transmittance of the filters. Therefore, an error may occur in the result of the computing process using the preliminarily-prepared system matrix H, possibly resulting in generation of an inaccurate image. In other words, there is a possibility of a significant decrease in the spectral resolution.

Accordingly, in a hyperspectral camera that acquires a multi-wavelength image, a change in the relative position between a filter array and an image sensor may lead to lower image quality of the multi-wavelength image. In particular, in the case where the information about the spatial distribution of the spectral transmittance of the filter array 100 is to be used for the computing process for generating multi-wavelength spectral images 220, as in the above-described example, the effect that a change in the relative position has on the image quality is notable. In an embodiment of the present disclosure, at least one characteristic section that the filter array 100 has is detected from an image acquired by the image sensor, and deviation of the relative position between the filter array and the image sensor is detectable based on information about the characteristic section. Moreover, the aforementioned problem can be solved by adopting an operation for compensating for the deviation. For example, a computational error caused by the deviation of the relative position can be reduced by physically correcting the relative position between the filter array and the image sensor or by correcting the acquired image data or the data indicating the spatial distribution of the spectral transmittance of the filter array. With the embodiment according to the present disclosure, a decrease in the spectral resolution due to a change in the relative position between the filter array and the image sensor from the preliminarily-set relative position can be prevented.

The present inventors have further conceived of a computing method for reducing an error occurring when images of wavelength bands are generated, regardless of whether or not there is deviation of the relative position between the filter array and the image sensor.

The general outline of the embodiments of the present disclosure will be described below.

An imaging apparatus according to an aspect of the present disclosure includes an image sensor, a filter array that is disposed on an optical path from a target object to the image sensor and that includes two-dimensionally-arranged optical filters, and a processing circuit that generates at least four pieces of spectral image data based on an image acquired by the image sensor. The optical filters include various types of optical filters with different spectral transmittance. Each of the at least four pieces of spectral image data indicates an image corresponding to one wavelength band of at least four wavelength bands. The filter array includes at least one characteristic section. The processing circuit detects a relative position between the filter array and the image sensor based on the at least one characteristic section in the image acquired by the image sensor, and compensates for deviation between the relative position and a preliminarily-set relative position when the processing circuit detects the deviation of the relative position.

According to the above configuration, the filter array has at least one characteristic section on, for example, the surface or the outer periphery thereof. The processing circuit can detect the relative position between the filter array and the image sensor based on information about, for example, the position, shape, or size of the at least one characteristic section included in the acquired image. When the relative position has changed from, for example, the preliminarily-set initial relative position, the processing circuit executes the operation for compensating for the deviation of the relative position. For example, the operation to be executed may involve physically correcting the relative position between the filter array and the image sensor or reducing the effect of the deviation of the relative position by signal processing. By executing such an operation, an error in the spectral image data caused by the deviation of the relative position can be reduced.

The imaging apparatus may further include a first driving device that moves the filter array. In that case, the processing circuit may correct the relative position by controlling the first driving device, so as to compensate for the deviation.

According to the above configuration, when the deviation of the relative position is detected, the first driving device moves the filter array so as to reduce the deviation of the relative position. Accordingly, an error in the spectral image data caused by the deviation of the relative position can be reduced. The first driving device may compensate for the deviation of the relative position by rotating the filter array.

The imaging apparatus may further include a second driving device that moves the image sensor. In that case, the processing circuit may correct the relative position by controlling the second driving device, so as to compensate for the deviation.

According to the above configuration, when the deviation of the relative position is detected, the second driving device moves the image sensor to reduce the deviation of the relative position. Accordingly, an error in the spectral image data caused by the deviation of the relative position can be reduced. The second driving device may compensate for the deviation of the relative position by rotating the image sensor.

The imaging apparatus may further include an optical system that is disposed on an optical path that connects the filter array and the image sensor and that forms an image of light transmitted through the filter array on an imaging surface of the image sensor, and a third driving device that changes a position of the image formed by the optical system. The processing circuit may correct the position of the image by controlling the third driving device, so as to compensate for the deviation.

According to the above configuration, when the deviation of the relative position is detected, for example, the third driving device moves or rotates the optical system to change the position of the image formed by the optical system. Accordingly, an error in the spectral image data caused by the deviation of the relative position can be reduced.

The processing circuit may generate the at least four pieces of spectral image data based on the image acquired by the image sensor and data indicating a spatial distribution of the spectral transmittance of the optical filters. In that case, the processing circuit may compensate for the deviation by correcting the data indicating the spatial distribution of the spectral transmittance.

According to the above configuration, when the processing circuit detects the deviation of the relative position, the processing circuit corrects the data indicating the spatial distribution of the spectral transmittance of the optical filters. The data indicating the spatial distribution of the spectral transmittance of the optical filters corresponds to, for example, the aforementioned matrix H. By correcting the data, an error in the spectral image data caused by the deviation of the relative position can be reduced.

The processing circuit may compensate for the deviation by correcting coordinates of the image acquired by the image sensor.

According to the above configuration, when the processing circuit detects the deviation of the relative position, the processing circuit corrects the coordinates of the image acquired by the image sensor. The correction of the coordinates of the image implies that the coordinate-versus-pixel-value correspondence relationship is corrected in the data indicating the image. The correction of the image corresponds to, for example, a coordinate conversion performed on the aforementioned vector g. The coordinate conversion may include translationally moving or rotating the aforementioned vector g. By correcting the acquired image, an error in the spectral image data caused by the deviation of the relative position can be reduced.

The filter array may have one or more alignment marks. The at least one characteristic section may be the one or more alignment marks.

The one or more alignment marks may be provided on, for example, the surface of the filter array. Each alignment mark may be provided in a pattern distinguishable from other areas on the image. For example, each alignment mark may be formed of a metallic film having lower transmittance than the transmittance of surrounding filters.

The one or more alignment marks may each include a first portion extending in a first direction and a second portion extending in a second direction that intersects the first direction. In that case, the processing circuit may detect a tilt of the filter array based on a ratio between a length of the first portion and a length of the second portion in the image acquired by the image sensor, and may further execute an operation for reducing an effect of the tilt.

The one or more alignment marks may include alignment marks. In that case, the processing circuit may detect a tilt of the filter array based on a positional relationship of the alignment marks in the image acquired by the image sensor, and may further execute an operation for reducing an effect of the tilt.

The tilt of the filter array refers to a state where the orientation of the filter array is inclined from a preliminarily-set appropriate orientation. The operation for reducing the effect of the tilt may include, for example, an operation for rotating the filter array or rotating the image sensor.

For example, the processing circuit can detect the tilt of the filter array based on the ratio between the distance between two alignment marks located away from each other in the first direction and the distance between two alignment marks located away from each other in the second direction.

According to the above configuration, an error in the spectral image data caused by the tilt of the filter array can be reduced.

The image sensor may include light detection elements each outputting a signal according to intensity of received light. The processing circuit may generate the at least four pieces of spectral image data based on the signal output from a light detection element, included in the light detection elements, receiving light transmitted through a region of the filter array. The one or more alignment marks may be located inside or outside the region.

If the one or more alignment marks are located outside the region, each alignment mark is detected from image data of a region not used for generating the spectral image data. Therefore, each alignment mark can be detected without having an effect on the spectral image data to be generated.

The one or more alignment marks may be located inside a range capable of being image-captured by the image sensor in a case where the relative position is the preliminarily-set relative position. In that case, each alignment mark is detected from the image acquired by the image sensor, and the deviation of the relative position between the filter array and the image sensor can be readily detected based on information about the position of the alignment mark.

The filter array may be larger than a range capable of being image-captured by the image sensor in a case where the relative position is the preliminarily-set relative position. The one or more alignment marks may be located outside the range. In that case, each alignment mark may be disposed near the boundary between the inside and the outside of the range capable of being image-captured. If each alignment mark is detected within the image acquired by the image sensor, the processing circuit can determine that the deviation of the relative position has occurred.

An imaging apparatus according to another aspect of the present disclosure includes an image sensor, a filter array that is disposed on an optical path from a target object to the image sensor and that includes two-dimensionally-arranged optical filters, and a processing circuit that generates at least four pieces of spectral image data based on an image acquired by the image sensor and data indicating a spatial distribution of spectral transmittance of the optical filters. The optical filters include various types of optical filters with different spectral transmittance. Each of the at least four pieces of spectral image data indicates an image corresponding to one wavelength band of at least four wavelength bands. The processing circuit executes (a) a first operation including repeating a process for generating the at least four pieces of spectral image data multiple times while changing a relative position between the filter array and the image sensor so as to generate sets of the at least four pieces of spectral image data, or (b) a second operation including repeating a process for generating the at least four pieces of spectral image data multiple times while changing coordinates of the image acquired by the image sensor so as to generate sets of the at least four pieces of spectral image data. The processing circuit combines the sets of the at least four pieces of spectral image data so as to generate output data.

According to the above configuration, the first operation or the second operation is executed, and the sets of the at least four pieces of spectral image data are combined, so that an error included in the spectral image data can be reduced.

The first operation may include correcting the data indicating the spatial distribution of the spectral transmittance in accordance with a change in the relative position.

The second operation may include correcting the data indicating the spatial distribution of the spectral transmittance in accordance with a change in the coordinates.

More detailed embodiments of the present disclosure will be described below. However, descriptions that are detailed more than necessary may sometimes be omitted. For example, detailed descriptions about already-known matters and redundant descriptions of substantially identical configurations may sometimes be omitted. This is to prevent the description from being redundant more than necessary, and to facilitate the understanding for a skilled person. The present inventors provide the appended drawings and the following description for allowing a skilled person to sufficiently understand the present disclosure and have no intention of limiting the gist defined in the scope of the claims. In the following description, identical or similar components are given the same reference signs. In the following description, an xyz coordinate system illustrated in each drawing is used.

First Embodiment

Figure 5:
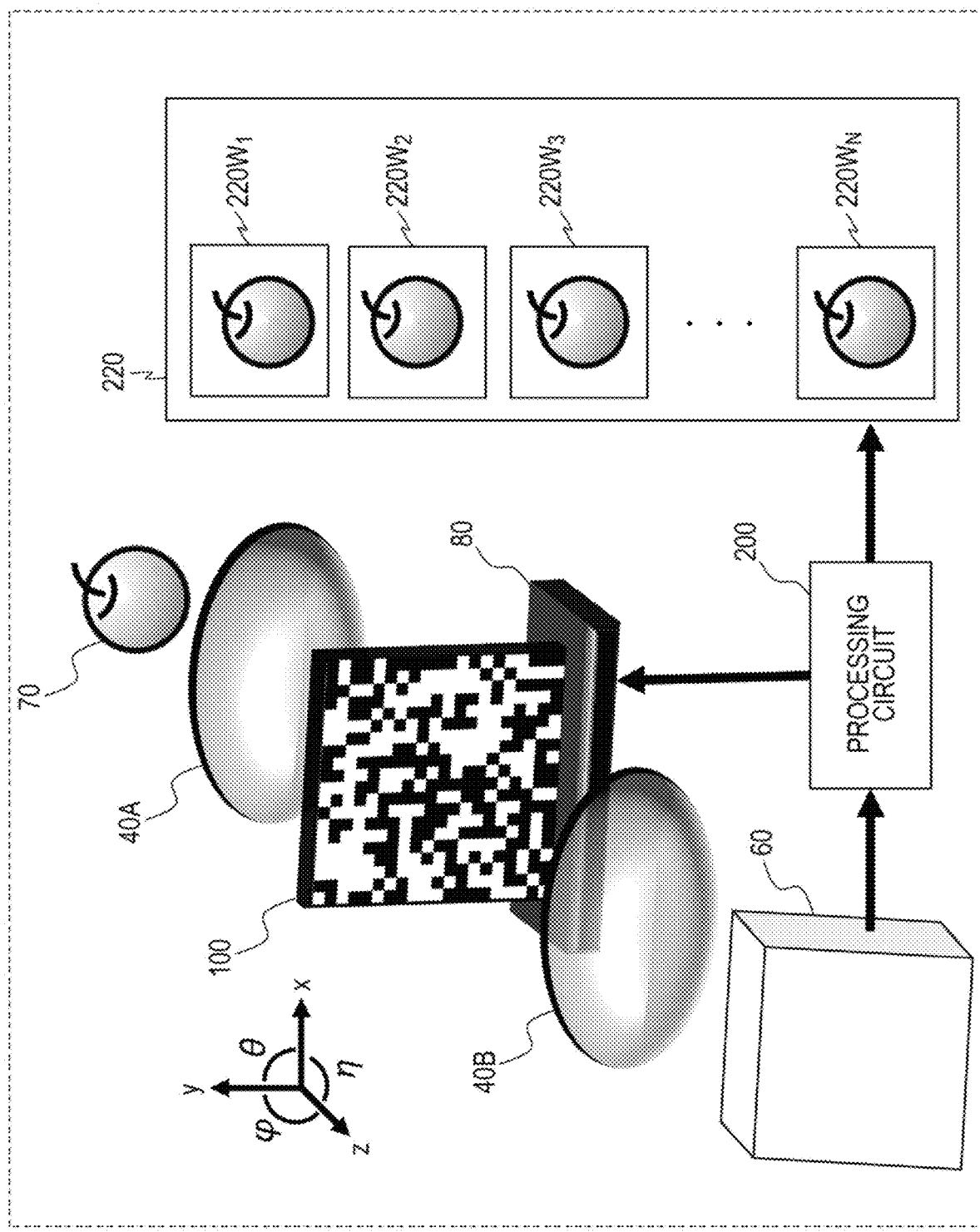
FIG. 5 schematically illustrates the configuration of an imaging apparatus according to a first exemplary embodiment of the present disclosure.

FIG. 5 schematically illustrates the configuration of an imaging apparatus according to a first exemplary embodiment of the present disclosure. The imaging apparatus according to this embodiment includes the filter array 100, the optical systems 40A and 40B, the image sensor 60, the processing circuit 200, and a movable stage 80.

The filter array 100 is disposed on an optical path from the target object 70 to the image sensor 60 and is located away from the image sensor 60. As mentioned above, the filter array 100 includes two-dimensionally-arranged optical filters. The optical filters include various types of optical filters with different spectral transmittance. The various types of optical filters are each designed such that light transmittance in each of at least two wavelength bands of N wavelength bands (N being an integer greater than or equal to 4) indicates a maximum value.

The optical system 40A is disposed between the target object 70 and the filter array 100. The optical system 40B is disposed between the filter array 100 and the image sensor 60. Each of the optical systems 40A and 40B includes at least one lens. The optical systems 40A and 40B form an image of light coming from the target object 70 and transmitted through the filter array 100 on an imaging surface of the image sensor 60.

As mentioned above, the image sensor 60 includes light detection elements two-dimensionally arranged on the imaging surface. Each light detection element includes a photoelectric converter, such as a photodiode, and outputs an electric signal according to the received light intensity. The image sensor 60 may be, for example, a CCD or CMOS sensor, an infrared array sensor, a terahertz array sensor, or a millimeter array sensor. The image sensor 60 does not necessarily have to be a monochrome-type sensor. For example, a color-type sensor having R/G/B, R/G/B/IR, or R/G/B/W filters may be used. By using a color-type sensor, the amount of wavelength-related information can be increased, so that the reconstruction accuracy of the spectral images 220 can be improved. However, if a color-type sensor is used, the amount of information in the spatial directions (x and y directions) decreases, so that the amount of wavelength-related information and the resolution have a trade-off relationship. The wavelength range as an acquisition target may be set arbitrarily. The wavelength range as an acquisition target is not limited to a visible wavelength range, and may be an ultraviolet, near-infrared, mid-infrared, far-infrared, or microwave wavelength range.

Light coming from the target object 70 travels through the optical system 40A, the filter array 100, and the optical system 40B in that order, and is focused on the imaging surface of the image sensor 60. A direction extending parallel to the optical axis of the optical systems 40A and 40B and extending from the target object 70 toward the image sensor 60 will be defined as a z direction. The filter array 100 is disposed substantially parallel to an xy plane including the x axis and the y axis that are orthogonal to the z axis. The image sensor 60 acquires an image of the light coming from the target object 70 and transmitted through the filter array 100.

The processing circuit 200 generates image data, that is, a spectral image 220, corresponding to each of the N wavelength bands based on image data output from the image sensor 60 and data indicating the spatial distribution of the spectral transmittance of the filter array 100. The data indicating the spatial distribution of the spectral transmittance of the filter array 100 is preliminarily stored in a memory included in the processing circuit 200. The processing circuit 200 performs a computing process based on Expression (2) mentioned above, so as to generate the images 220 corresponding to the respective wavelength bands.

The processing circuit 200 may be realized by, for example, a digital signal processor (DSP), a programmable logic device (PLD) such as a field programmable gate array (FPGA), or a combination of a central processing unit (CPU), a graphics processing unit (GPU), and a computer program. Such a computer program is stored in a storage medium, such as a memory. By executing the program, the CPU can execute the computing process for generating the spectral images 220.

The processing circuit 200 according to this embodiment further detects at least one characteristic section in the filter array 100 from the image acquired by the image sensor 60. Then, based on information about, for example, the position, shape, and size of the characteristic section, the relative position between the filter array 100 and the image sensor 60 is detected. When the relative position has deviated from a preliminarily-set relative position, the processing circuit 200 executes an operation for compensating for the deviation. In this embodiment, the operation for compensating for the deviation of the relative position includes an operation for correcting the relative position between the filter array 100 and the image sensor 60 by controlling the movable stage 80.

The movable stage 80 is a driving device that changes at least one of the position and the orientation of the filter array 100. The filter array 100 is fixed to the movable stage 80. The movable stage 80 can move or rotate the filter array 100 independently of the target object 70, the optical systems 40A and 40B, and the image sensor 60. The movable stage 80 can cause the filter array 100 to move along the x axis, the y axis, or the z axis, rotate within the xy plane, the yz plane, or the xz plane, or move in accordance with a combination of these motions. The movable stage 80 may only have a function for moving along the x axis, the y axis, or the z axis. The operation of the movable stage 80 is controlled by the processing circuit 200. Although the movable stage 80 according to this embodiment is an electrically-operated driving device, the movable stage 80 may alternatively be of a manually-operated type.

Figure 6B:
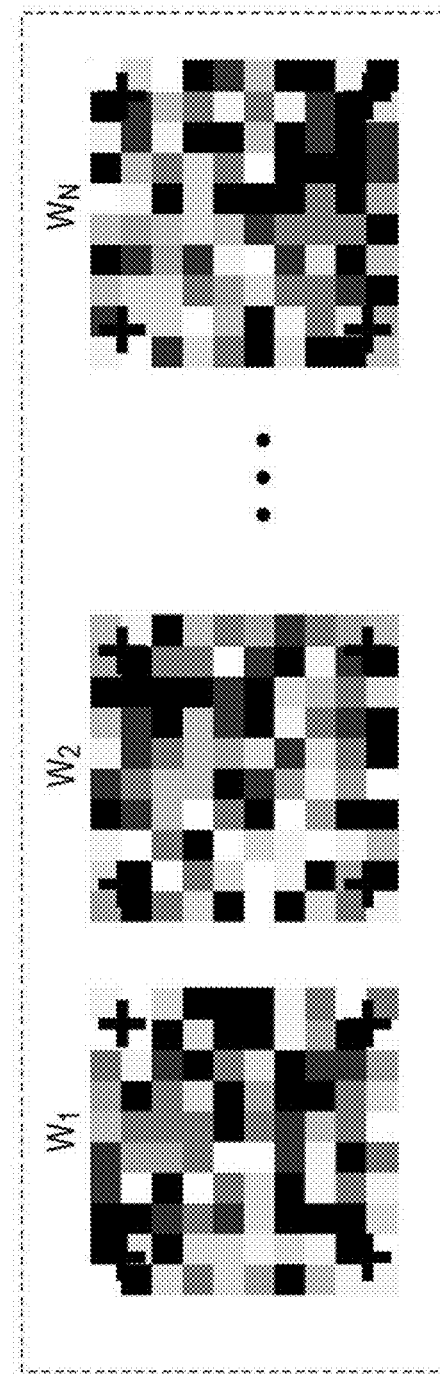
FIG. 6B illustrates an example of the spatial distribution of the transmittance of the filter array with respect to N wavelength bands included in the target wavelength range.

FIG. 6A is a diagram for explaining the filter array 100. The left side of FIG. 6A schematically illustrates the configuration of the filter array 100. The right side of FIG. 6A illustrates an example of spectral transmittance of two of the filters in the filter array 100. FIG. 6B illustrates an example of the spatial distribution of the transmittance of the filter array 100 with respect to the N wavelength bands $W_1$, $W_2$, ..., and $W_N$ included in the target wavelength range. Although FIGS. 6A and 6B each illustrate a region having 10 square-shaped filters arranged in a grid pattern in each of the vertical direction and the horizontal direction of the filter array 100, this is merely an example. Each filter in the filter array 100 is not limited to a square shape and may have any shape that allows for tessellation. Moreover, the number of arrays in each of the vertical direction and the horizontal direction is not limited to 10, and may be any number. Each filter in the filter array 100 and the overall filter array 100 may have any size.

FIG. 6A illustrates an example where the region occupied by the filter array 100 includes a range 102 capable of being image-captured by the image sensor 60 when there is no deviation of the relative position and a range 104 where a spectral image 220 is to be generated. As in this example, the range 104 where a spectral image 220 is to be generated may be smaller than the range 102 capable of being image-captured. In this case, the processing circuit 200 extracts a portion corresponding to the range 104 where a spectral image 220 is to be generated from the image data generated by the image sensor 60, thereby generating the spectral image 220. In other words, the processing circuit 200 generates image data for each of the N wavelength bands based on a signal output from a light detection element, as one of the light detection elements in the image sensor 60, receiving light transmitted through a partial region (i.e., the range 104 where a spectral image 220 is to be generated) of the filter array 100. In the example in FIG. 6A, only a portion of the filter array 100 is included in the range 102 capable of being image-captured by the image sensor 60.

The filter array 100 illustrated in FIG. 6A includes alignment marks 106 inside the range 102 capable of being image-captured by the image sensor 60. In this embodiment, four alignment marks 106 are disposed at four corners within the range 102 capable of being image-captured. Each alignment mark 106 has a size in which an image larger than one pixel of the image sensor 60 is formed when light is focused on the imaging surface of the image sensor 60. The number, shape, and size of each alignment mark 106 are not limited to those in the illustrated example, and may be selected arbitrarily.

The size of the range 104 where a spectral image 220 is to be generated may be the same as or smaller than the size of the range 102 capable of being image-captured by the image sensor 60. If the range 104 where a spectral image 220 is to be generated is smaller than the range 102 capable of being image-captured, the alignment marks 106 may be disposed outside the range 104 where a spectral image 220 is to be generated, as illustrated in FIG. 6A, or may be disposed inside the range 104.

Although FIG. 6A illustrates cross-shaped alignment marks 106 as an example, the shape of the alignment marks 106 may be arbitrarily set so long as the positions thereof are identifiable. The alignment marks 106 may each have, for example, any polygonal shape, a completely or partially circular shape, or a combination of these shapes.

Figure 6C:
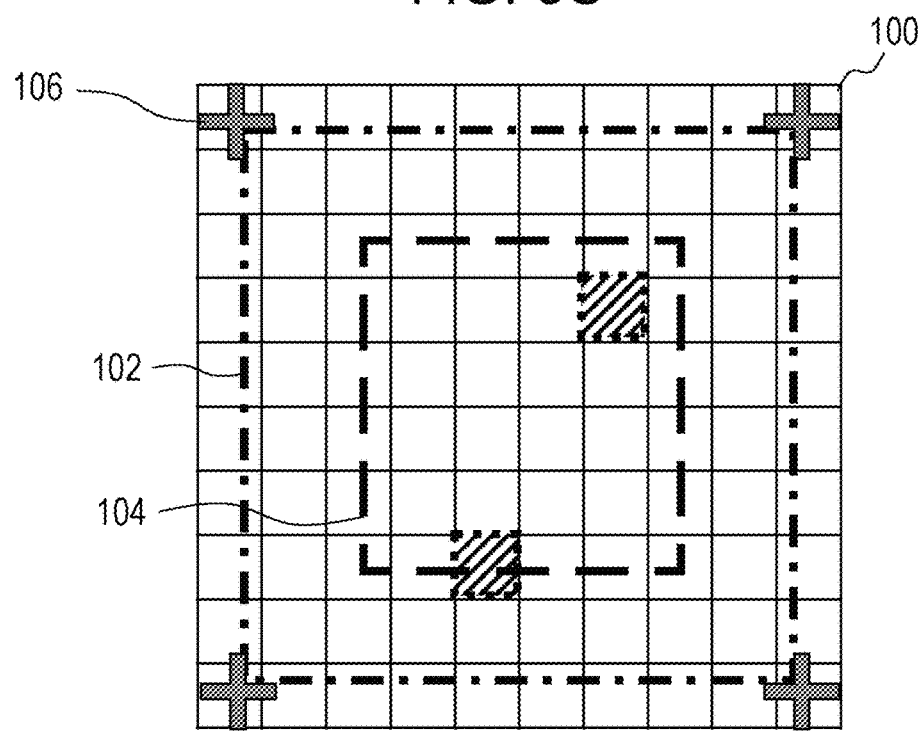
FIG. 6C illustrates a modification of the filter array.

As illustrated in FIG. 6C, the alignment marks 106 may be disposed outside the range 102 capable of being image-captured by the image sensor in a case where the relative position between the filter array 100 and the image sensor 60 is located at the preliminarily-set relative position. In this case, if deviation of the relative position has not occurred, the alignment marks 106 are not detected from the acquired image. If deviation of the relative position has occurred, the alignment marks 106 are detected. Based on the positions of the detected alignment marks 106, the deviation of the relative position can be detected.

Figure 6D:
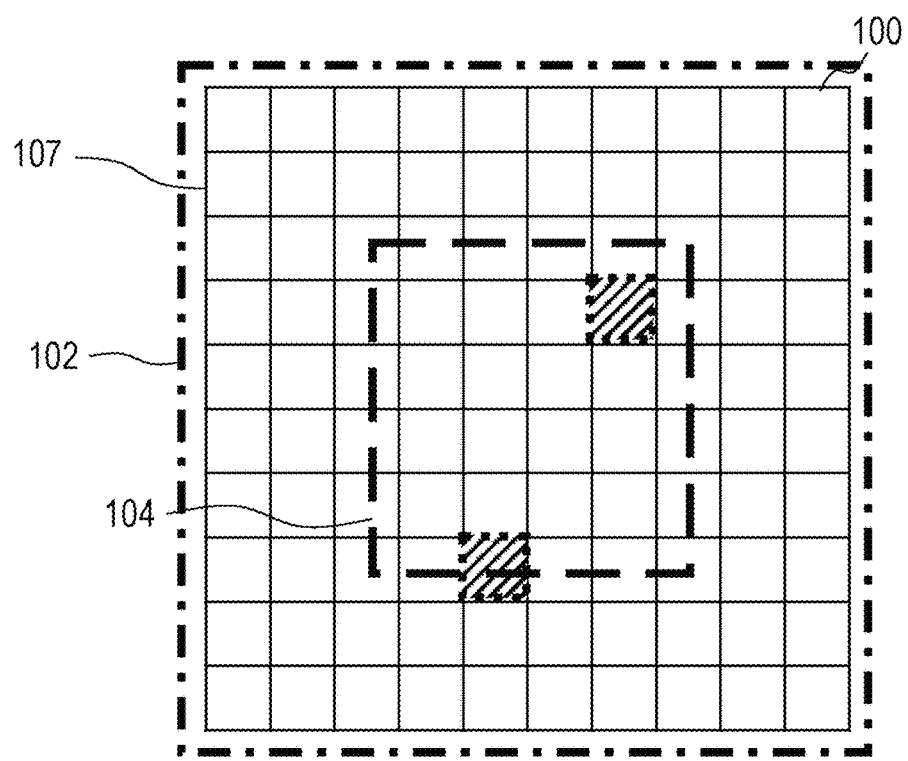
FIG. 6D illustrates another modification of the filter array.

As illustrated in FIG. 6D, the range 102 capable of being image-captured by the image sensor 60 may include a region outside the filter array 100. In that case, a boundary section 107 between the inside and the outside of the filter array 100 functions similarly to the alignment marks 106. In such a configuration, the filter array 100 does not include explicit marks, and an outer periphery that separates the inside and the outside of the filter array 100 from each other functions as a characteristic section for alignment.

Figure 7:
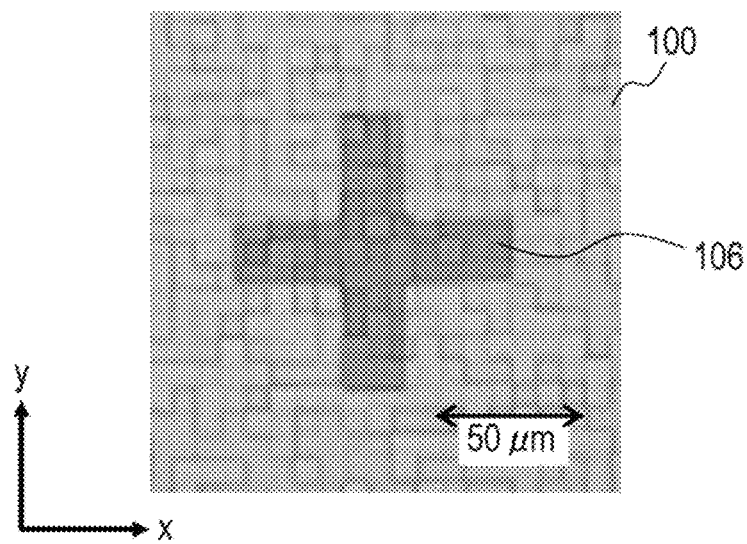
FIG. 7 illustrates an image indicating an example of an alignment mark actually formed on the filter array.

FIG. 7 illustrates an image indicating an example of one of the alignment marks 106 actually formed on the filter array 100. In this example, a cross-shaped chromium (Cr) film is formed as the alignment mark 106 on the surface of the filter array 100. Small square-shaped blocks in FIG. 7 indicate individual filters. In this example, one side of each filter has a length of about 8 micrometers (μm). Each cross-shaped alignment mark 106 has a shape in which two linear portions intersect each other. When receiving white light, the chromium film indicates transmittance lower than the surrounding filter region. Therefore, as illustrated in FIG. 7, the chromium film is observed as a darker area. Each alignment mark 106 is not limited to a chromium film and may be composed of any material so long as it is distinguishable from other areas.

The processing circuit 200 detects the center coordinates of each cross-shaped alignment mark 106 illustrated as an example in FIG. 7, so as to be capable of detecting the relative position of the filter array 100 as viewed from the image sensor 60.

Figure 8A:
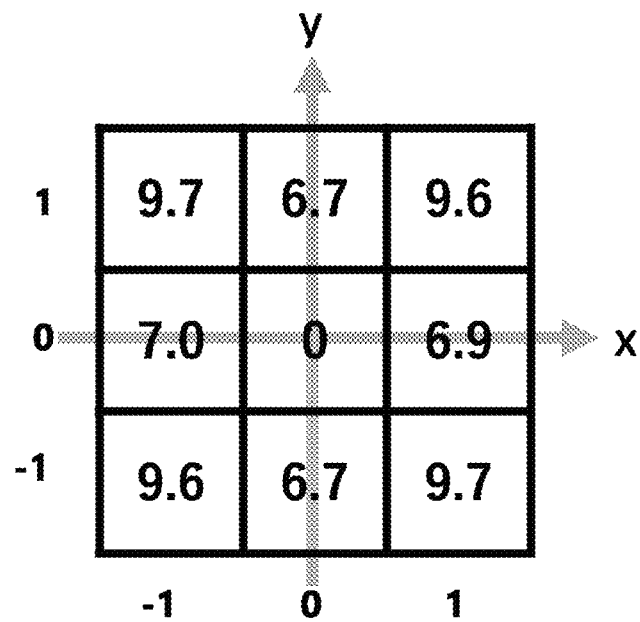
FIG. 8A illustrates an example of rates of change (in units of %) in the transmittance of the filter array occurring when a relative position of the filter array as viewed from an image sensor has deviated by an amount equivalent to one pixel in an x direction and a y direction.
Figure 8B:
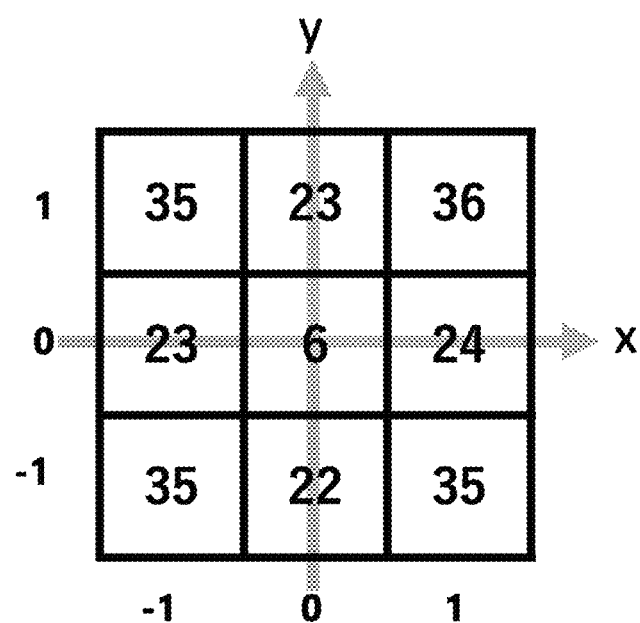
FIG. 8B illustrates an example of an error in average brightness between a generated image and a ground truth image.

FIG. 8A illustrates an example of rates of change (in units of %) in the transmittance of the filter array 100 occurring when the relative position of the filter array 100 as viewed from the image sensor 60 has deviated by an amount equivalent to one pixel in the x direction and the y direction. With reference to the transmittance when the relative position between the filter array 100 and the image sensor 60 is located at an initial position, rates of change (in units of %) of average transmittance in a 100 square by 100 square region are indicated. As illustrated in FIG. 8A, the transmittance changes as a result of simply changing the relative position by an amount equivalent to the size of one pixel of the image sensor 60. As a result, the processing circuit 200 may possibly generate an image significantly different from a ground truth image. FIG. 8B illustrates an example of an error in average brightness between the image generated by the processing circuit 200 and the ground truth image. As illustrated in FIG. 8B, the error in the average brightness significantly increases as a result of the relative position between the filter array 100 and the image sensor 60 deviating only by an amount equivalent to one pixel in the x direction or the y direction.

Accordingly, a change in the relative position between the filter array 100 and the image sensor 60 has a strong effect on the accuracy for generating an image. Therefore, it is desirable to reduce the effect caused by the change in the relative position.

In this embodiment, the filter array 100 having the alignment marks 106 can detect the relative position between the image sensor 60 and the filter array 100. The hardware of the imaging apparatus or the processing to be performed on the acquired image is corrected in accordance with the change in the detected relative position, thereby preventing the spectral resolution from decreasing.

The processing circuit 200 illustrated in FIG. 5 controls the movable stage 80 in accordance with the change in the detected relative position, thereby correcting the position of the filter array 100. Accordingly, a decrease in image quality caused by the change in the relative position can be suppressed.

Figure 9A:
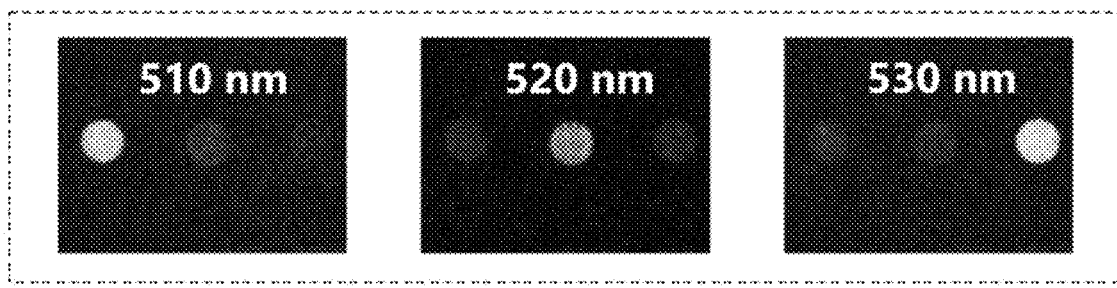
FIG. 9A illustrates an example of images generated for the respective wavelength bands.
Figure 9B:
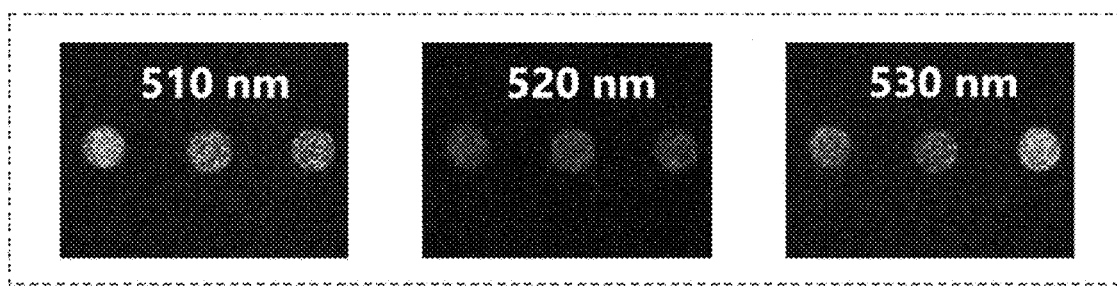
FIG. 9B illustrates an example of images generated for the respective wavelength bands when a correction is not performed.

FIG. 9A illustrates an example of images generated by the processing circuit 200 according to this embodiment for respective wavelength bands. FIG. 9B illustrates an example of images generated for the respective wavelength bands when the correction according to the embodiment is not performed. In these examples, the position of the filter array 100 has changed by an amount equivalent to about 1.5 pixels in the vertical direction of the image from when data indicating the spatial distribution of the spectral transmittance is acquired. Three types of filters that transmit 510-nm, 520-nm, and 530-nm light beams, respectively, from the target object 70 are used, and an imaging process is performed in a state where white light is radiated from behind. As illustrated in FIG. 9B, when the correction is not performed, the three wavelength bands are not properly separated, and the images are not properly generated for the respective wavelength bands. In other words, the spectral resolution has decreased. In contrast, in the example illustrated in FIG. 9A, since the position of the filter array 100 has been corrected, spots corresponding to the three types of filters are clearly displayed. In other words, a decrease in the spectral resolution is suppressed.

Accordingly, by using the imaging apparatus illustrated in FIG. 5, the relative position between the filter array 100 and the image sensor 60 can be adjusted, thereby preventing a decrease in the spectral resolution caused by the change in the relative position.

Figure 10:
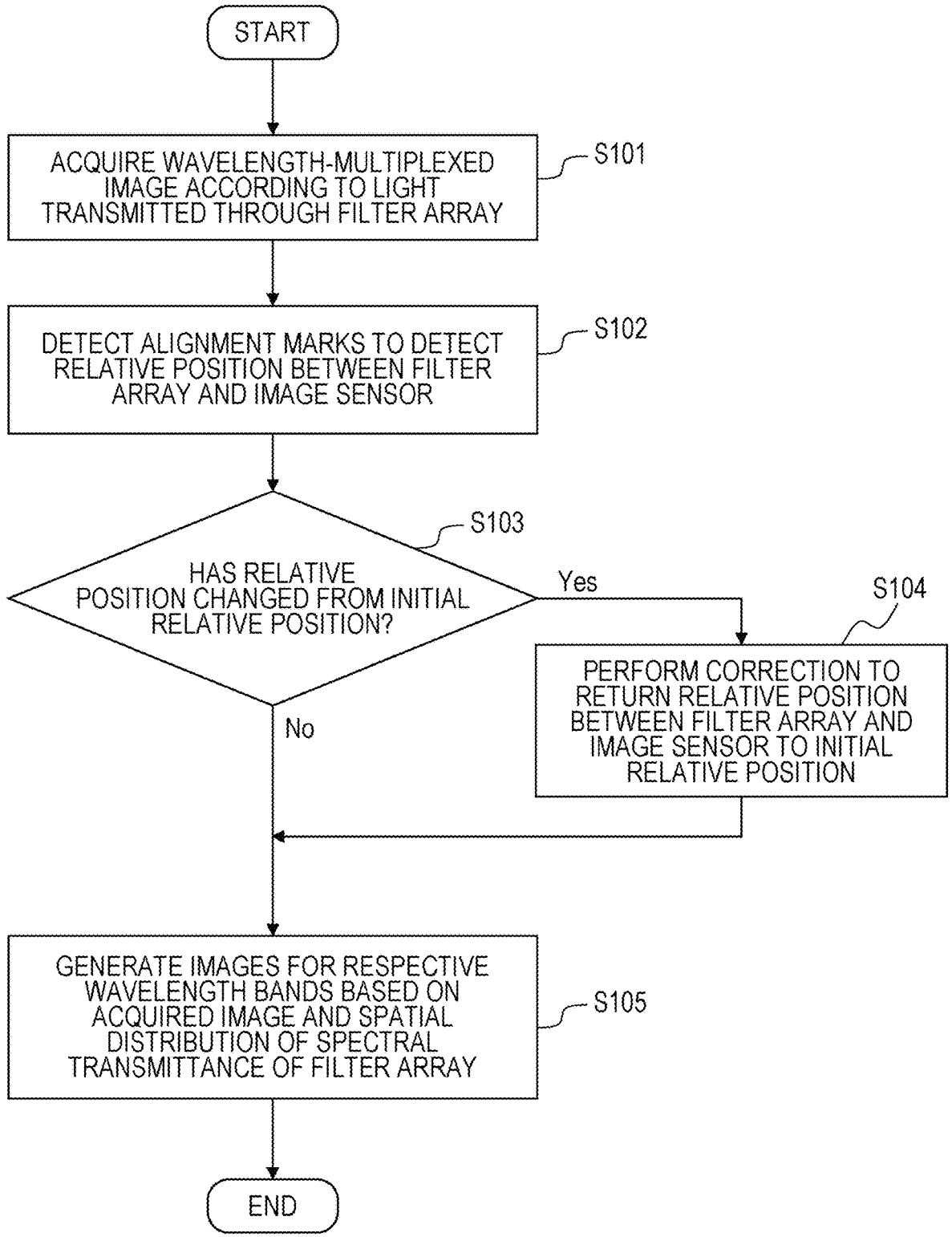
FIG. 10 is a flowchart illustrating the general outline of a process executed by a processing circuit.

FIG. 10 is a flowchart illustrating the general outline of a process executed by the processing circuit 200 according to this embodiment. First, in step S101, the processing circuit 200 acquires, from the image sensor 60, a wavelength-multiplexed image in which wavelength components according to light transmitted through the filter array 100 are superimposed one on top of the other. Then, in step S102, the processing circuit 200 detects the alignment marks 106 from the acquired image, so as to detect the relative position between the filter array 100 and the image sensor 60. In this case, the relative position indicates an amount by which the center coordinates of the filter array 100 have shifted relative to the center coordinates of the imaging surface of the image sensor 60 in the x direction and the y direction. In step S103, the processing circuit 200 determines whether or not the relative position between the filter array 100 and the image sensor 60 has changed from the preliminarily-set initial relative position. In this case, the initial relative position indicates the relative position when data indicating the spatial distribution of the spectral transmittance of the filter array 100 is acquired. If a change in the relative position is confirmed in step S103, the process proceeds to step S104. In step S104, the processing circuit 200 commands the movable stage 80 to return the relative position between the filter array 100 and the image sensor 60 to the initial position. In response to this command, the movable stage 80 corrects the position of the filter array 100. If a change in the relative position is not confirmed in step S103, step S104 is not performed, and the process proceeds to step S105. In step S105, the processing circuit 200 generates pieces of image data for respective wavelength bands based on the image acquired by the image sensor 60 and the data indicating the spatial distribution of the spectral transmittance of the filter array 100.

As a result of the above operation, deviation of the relative position between the filter array 100 and the image sensor 60 from an appropriate value is detected, so that the relative position can be corrected to compensate for the deviation. Accordingly, a decrease in the spectral resolution caused by the change in the relative position can be suppressed.

Figure 11:
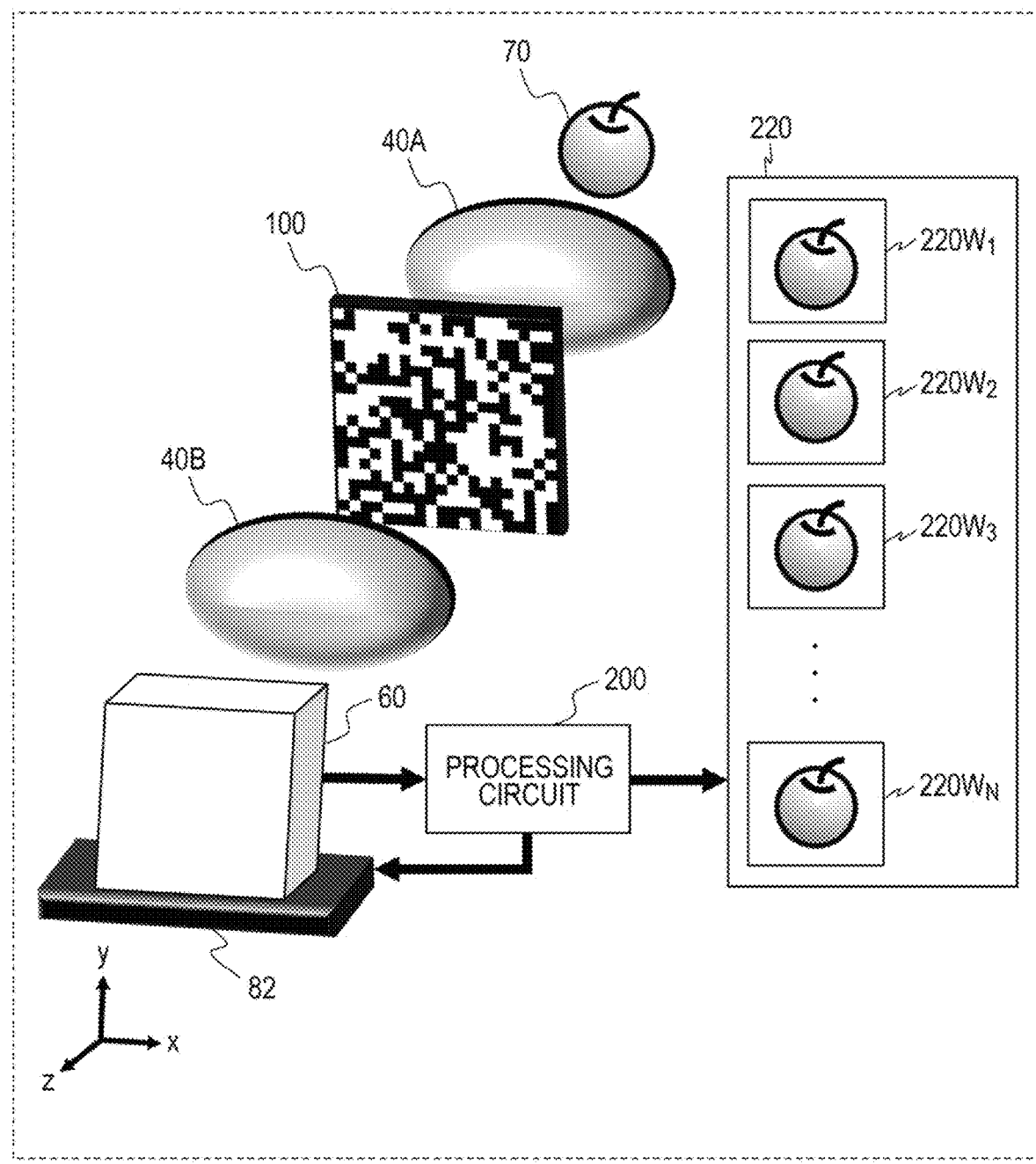
FIG. 11 schematically illustrates the configuration of an imaging apparatus according to a modification of the first embodiment.

FIG. 11 schematically illustrates the configuration of an imaging apparatus according to a modification of this embodiment. In this modification, the imaging apparatus includes a movable stage 82 serving as a second driving device that changes the position of the image sensor 60 instead of the filter array 100. The image sensor 60 is disposed on the movable stage 82. The processing circuit 200 controls the movable stage 82 to change the position of the image sensor 60 along at least one of the x axis, the y axis, and the z axis. Accordingly, the relative position between the filter array 100 and the image sensor 60 is corrected. As in the example illustrated in FIG. 5, the image sensor 60 may be rotatable within at least one of the xy plane, the yz plane, and the xz plane.

Figure 12:
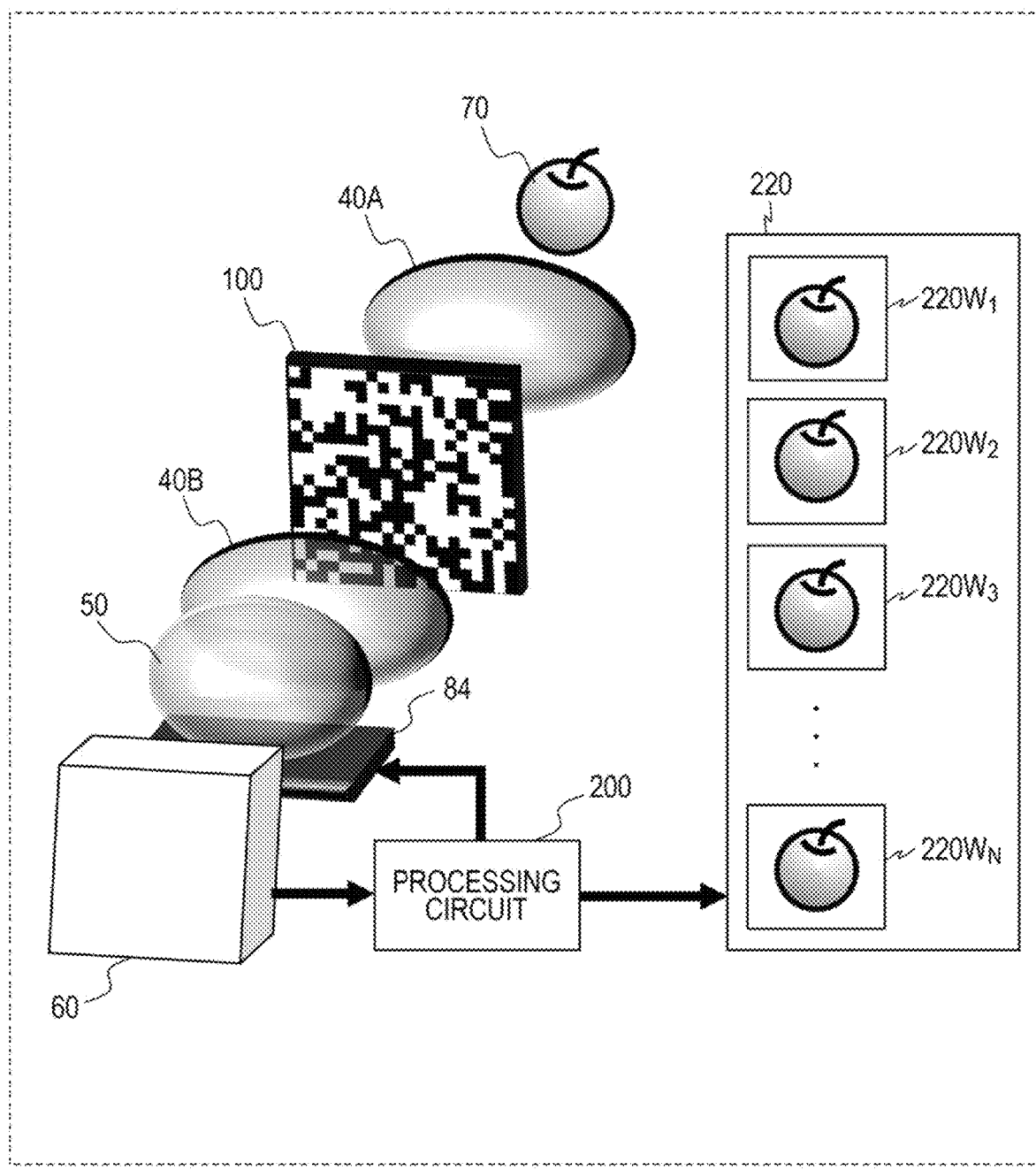
FIG. 12 schematically illustrates the configuration of an imaging apparatus according to another modification of the first embodiment.

FIG. 12 schematically illustrates the configuration of an imaging apparatus according to another modification. In this modification, a movable stage for moving the filter array 100 or the image sensor 60 is not provided. The imaging apparatus according to this modification includes an optical system 50 disposed between the optical system 40B and the image sensor 60 and a movable stage 84 serving as a third driving device that changes the position of the optical system 50. The optical system 50 includes at least one lens. In place of the lens or in addition to the lens, an optical element having a reflective function, such as a mirror, may be provided.

Each of the optical systems 40A, 40B, and 50 is disposed on an optical path that connects the filter array 100 and the image sensor 60 and forms an image of light transmitted through the filter array 100 on the imaging surface of the image sensor 60. The movable stage 84 moves or rotates the at least one lens included in the optical system 50, so as to change the position of the image to be formed. The processing circuit 200 controls the movable stage 84 to change the focusing position, thereby compensating for deviation of the relative position between the filter array 100 and the image sensor 60.

Second Embodiment

Figure 13:
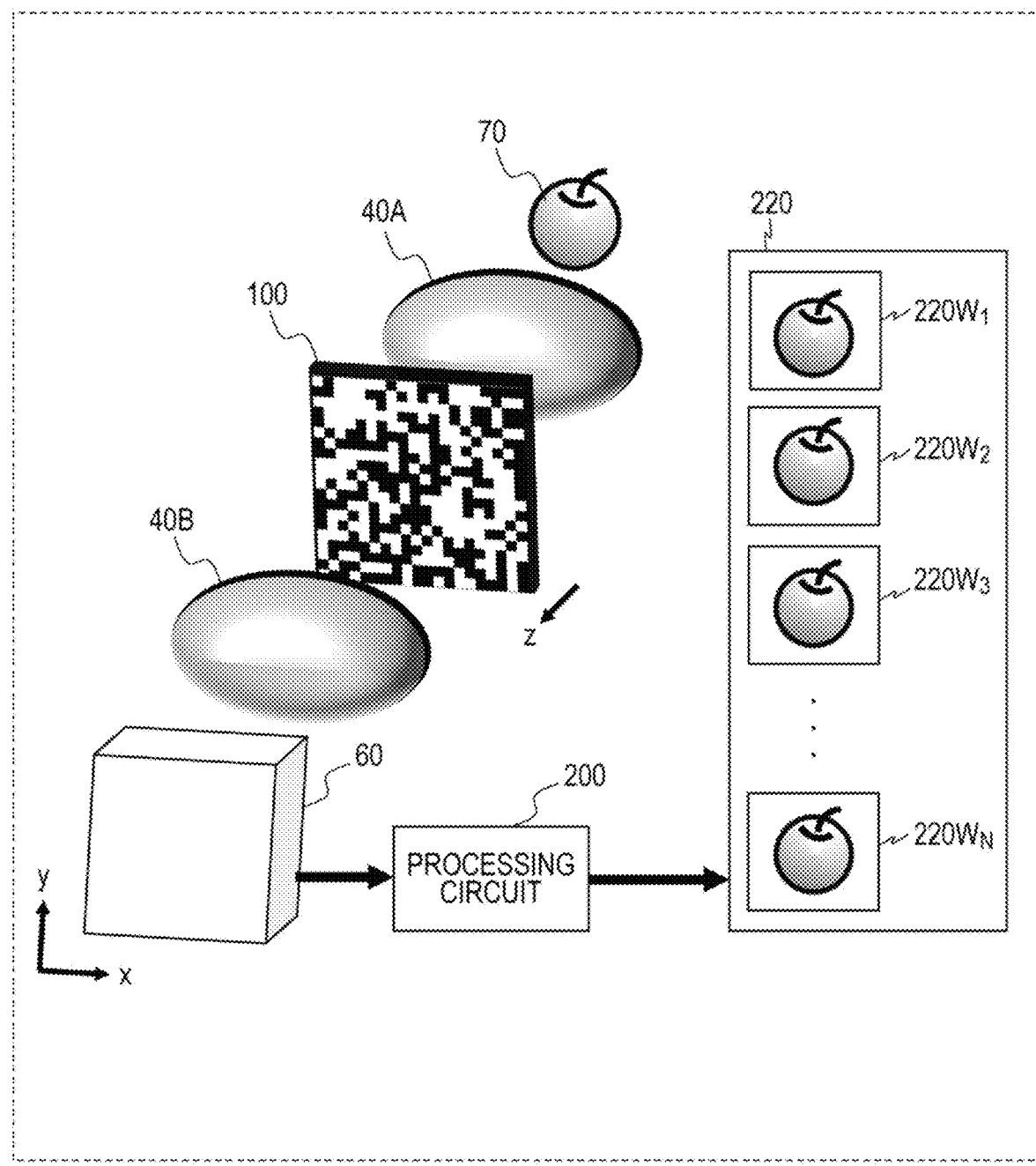
FIG. 13 schematically illustrates the configuration of an imaging apparatus according to a second exemplary embodiment of the present disclosure.

FIG. 13 schematically illustrates the configuration of an imaging apparatus according to a second exemplary embodiment of the present disclosure. In this embodiment, instead of physically adjusting the relative position between the filter array 100 and the image sensor 60, the processing circuit 200 compensates for the deviation of the relative position. More specifically, the processing circuit 200 corrects the data indicating the spatial distribution of the spectral transmittance of the filter array 100 or the image acquired by the image sensor 60, so as to reduce the effect of the change in the relative position between the filter array 100 and the image sensor 60.

The data indicating the spatial distribution of the spectral transmittance of the filter array 100 may be, for example, data indicating the matrix H in Expression (2) indicated above. The correction of the data indicating the spatial distribution of the spectral transmittance implies that, for example, each component of the matrix H is corrected to cancel out or reduce the detected change in the relative position. The correction of the image acquired by the image sensor 60 implies that, for example, the vector g in Expression (2) is parallel-shifted, rotated, or expanded or reduced. For example, it is conceived that the relative position of the filter array 100 as viewed from the image sensor 60 has changed in the y direction illustrated in FIG. 13 by an amount equivalent to n pixels of the image sensor 60. In this case, the processing circuit 200 performs an operation for parallel-shifting each component of the matrix H or the vector g in Expression (2) by n in the y direction.

Figure 14A:
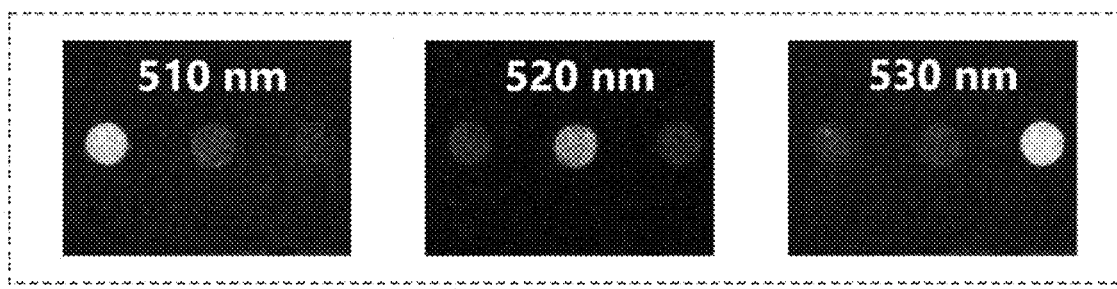
FIG. 14A is a first diagram for explaining the advantages of the second embodiment.
Figure 14B:
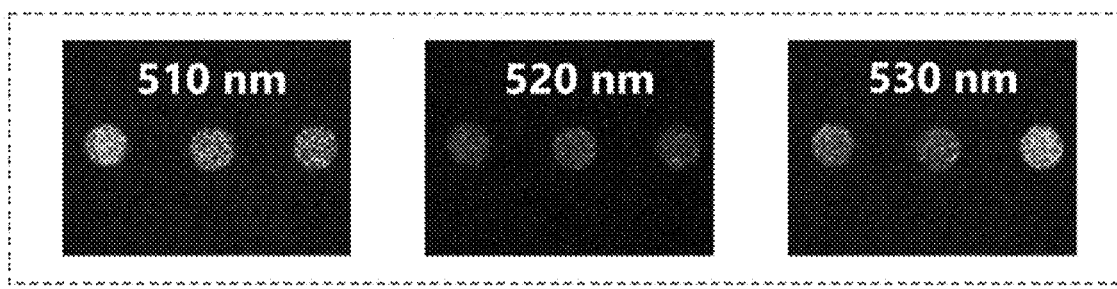
FIG. 14B is a second diagram for explaining the advantages of the second embodiment.
Figure 14C:
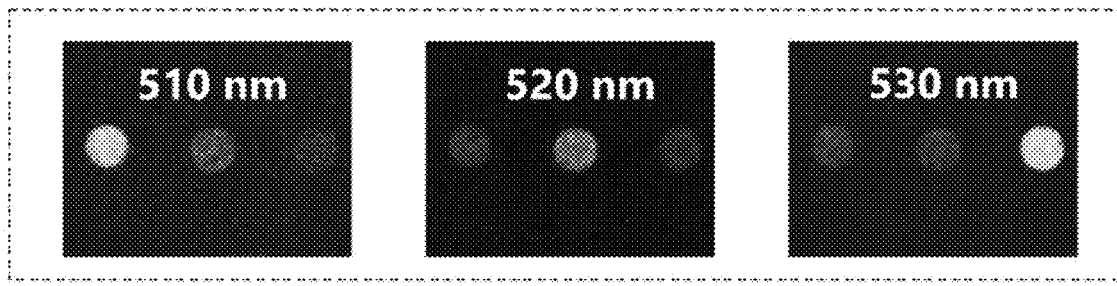
FIG. 14C is a third diagram for explaining the advantages of the second embodiment.

FIGS. 14A to 14C are diagrams for explaining the advantages of this embodiment. FIG. 14A illustrates an example of reconstruction results of images of three wavelength bands in a case where the relative position between the filter array 100 and the image sensor 60 has not changed from the initial relative position (corresponding to the vector g). FIG. 14B illustrates an example of reconstruction results of images of the three wavelength bands in a case where the relative position between the filter array 100 and the image sensor 60 has deviated from the initial relative position (corresponding to a case where the vector has changed from g to g') and the matrix H is not corrected. FIG. 14C illustrates an example of reconstruction results of images of the three wavelength bands in a case where the relative position between the filter array 100 and the image sensor 60 has deviated from the initial relative position (corresponding to the vector g') and the matrix is appropriately corrected (corresponding to a case where the vector is corrected to H'). These examples are similar to the examples in FIGS. 9A and 9B in that three filters that transmit 510-nm, 520-nm, and 530-nm light beams, respectively, from the target object 70 are disposed. As illustrated in FIG. 14A, a state where the three filters are displayed as spots indicates proper reconstruction images. In the example in FIG. 14B, proper images are not generated. In contrast, as illustrated in FIG. 14C, when the matrix H is appropriately corrected, it is confirmed that the generated images resemble the images illustrated in FIG. 14A. By correcting the matrix H in this manner, a decrease in the spectral resolution can be prevented. Similar advantages can be achieved by correcting the vector g indicating the acquired image instead of correcting the matrix H.

Accordingly, in this embodiment, the operation for compensating for the deviation of the relative position includes an operation for correcting the data indicating the spatial distribution of the spectral transmittance of the optical filters in the filter array 100 or the coordinates of the image acquired by the image sensor 60. For example, the processing circuit 200 corrects the data of the matrix indicating the spatial distribution of the spectral transmittance of the filter array 100 or the data of the image acquired by the image sensor 60. Consequently, a decrease in the spectral resolution caused by a change in the relative position between the filter array 100 and the image sensor 60 can be suppressed.

Third Embodiment

Figure 15A:
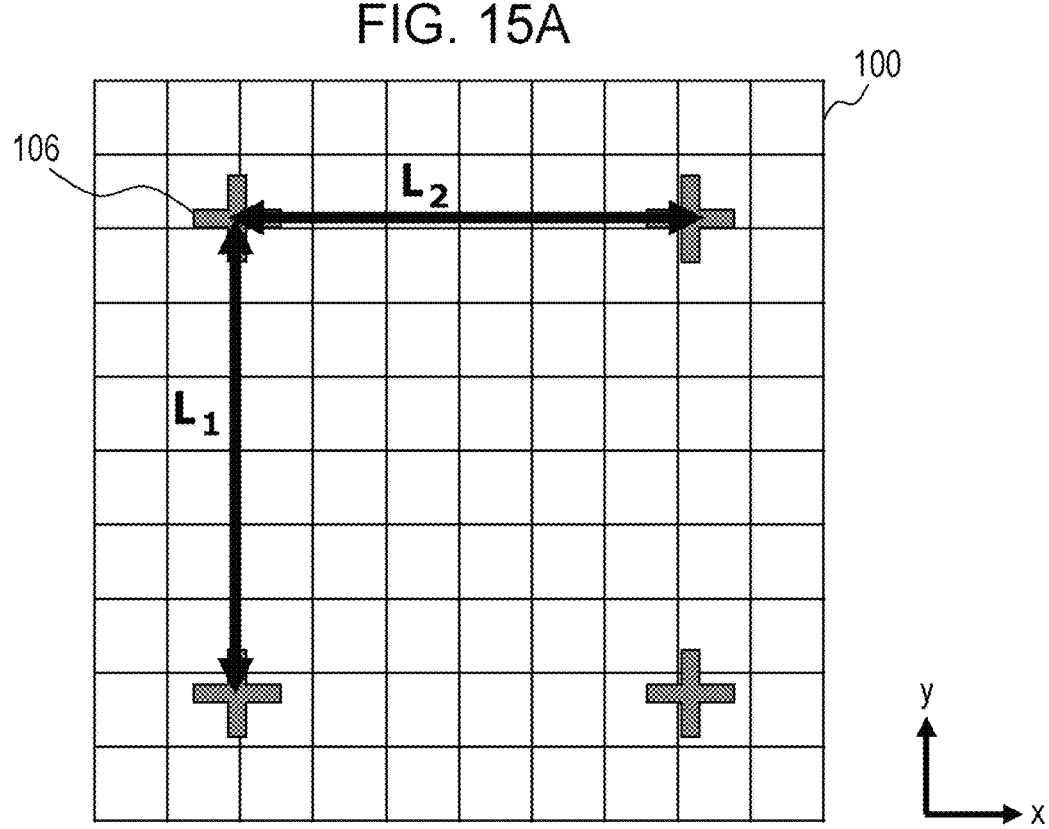
FIG. 15A schematically illustrates an example of a filter array according to a third exemplary embodiment of the present disclosure.

FIG. 15A schematically illustrates an example of a filter array 100 according to a third exemplary embodiment of the present disclosure. The configuration of an imaging apparatus according to this embodiment is similar to the configuration illustrated in FIG. 5. In this embodiment, the processing circuit 200 detects a tilt of the filter array 100 based on the positional relationship among the alignment marks 106 instead of the position of one of the alignment marks 106. The tilt of the filter array 100 refers to an inclination of the filter array 100 from a plane orthogonal to the optical axis of the optical systems 40A and 40B. In the example illustrated in FIG. 15A, the processing circuit 200 detects the tilt by measuring a distance L1 in the y direction of the alignment marks 106 and a distance L2 in the x direction of the alignment marks 106 based on the acquired image. If the tilt occurs in the filter array 100 in the φ direction illustrated in FIG. 5, L1 is observed as being shorter than the original length, whereas if the tilt occurs in the η direction, L2 is observed as being shorter than the original length. If the tilt occurs by an angle of $\phi_1$ in the φ direction illustrated in FIG. 5, the length of L1 is $\cos(\phi_1)$ times the original length. Likewise, if the tilt occurs by an angle of $\eta_1$ in the η direction illustrated in FIG. 5, the length of L2 is $\cos(\eta_1)$ times the original length.

Figure 15B:
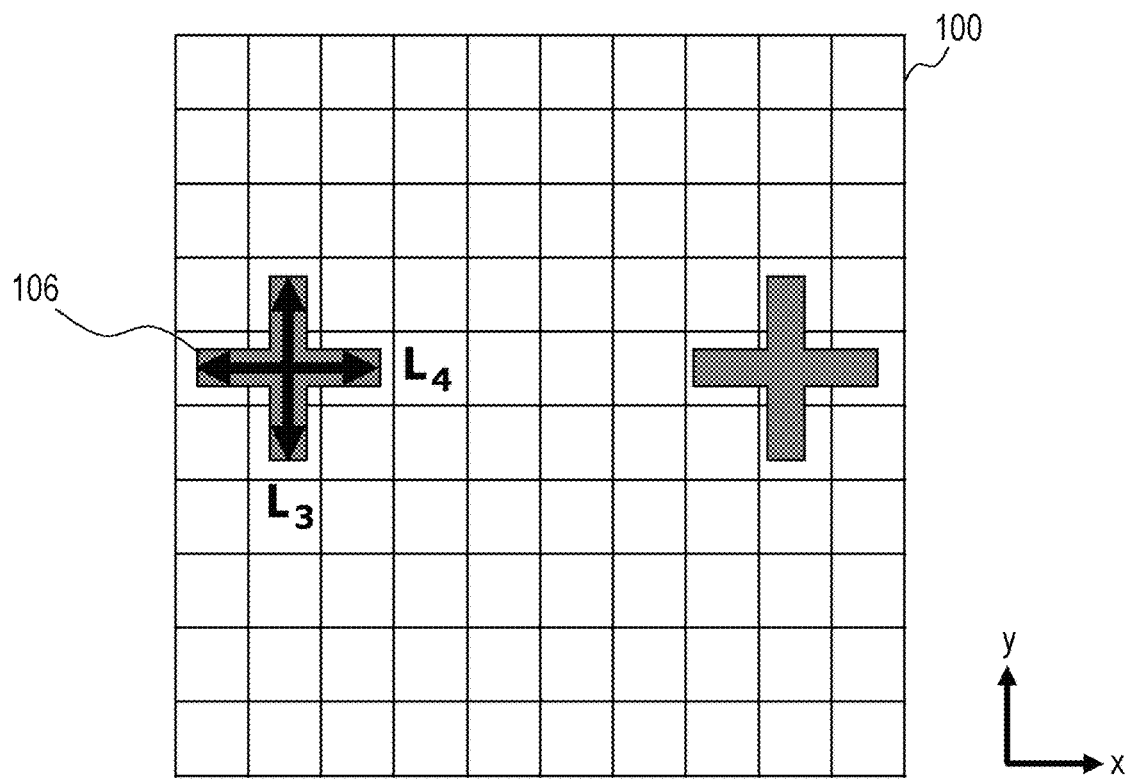
FIG. 15B schematically illustrates a filter array according to a modification of the third embodiment.

FIG. 15B schematically illustrates a filter array 100 according to a modification of this embodiment. Each alignment mark 106 has a shape including a first portion extending in the y direction and a second portion extending in the x direction. By measuring a length L3 of the first portion and a length L4 of the second portion, the tilt of the filter array 100 can be detected. Although the first portion and the second portion are orthogonal to each other in this example, the two portions may intersect each other at an angle different from 90 degrees. The processing circuit 200 detects the tilt of the filter array 100 based on the ratio between the length of the first portion and the length of the second portion of at least one alignment mark 106 in the image acquired by the image sensor 60, and executes an operation for reducing the effect of the tilt.

For example, the operation for reducing the effect of the tilt may be executed by controlling the movable stage 80 illustrated in FIG. 5. In place of the configuration illustrated in FIG. 5, for example, the configuration illustrated in FIG. 11 may be employed. In that case, the movable stage 82 that can change the orientation of the image sensor 60 may be used. Alternatively, instead of correcting the relative position by mechanical driving, the effect of the tilt may be reduced by software-based processing, similarly to the second embodiment.

Fourth Embodiment

In the above embodiments, the processing circuit 200 detects the relative position between the filter array 100 and the image sensor 60 based on at least one characteristic section (e.g., alignment mark 106) of the filter array 100 in the image acquired by the image sensor 60. Then, if the relative position has deviated from the preliminarily-set relative position, the operation for compensating for the deviation of the relative position is executed.

In contrast, in a fourth embodiment, the processing circuit 200 executes either of the following operations (a) and (b).

(a) A process for generating image data with respect to each of the N wavelength bands is repeated multiple times while changing the relative position between the filter array 100 and the image sensor 60 and correcting the data indicating the spatial distribution of the spectral transmittance in accordance with the change in the relative position, thereby generating sets of image data for each wavelength band.

(b) A process for generating image data with respect to each of the N wavelength bands is repeated multiple times while changing the coordinates of the image acquired by the image sensor 60 and correcting the data indicating the spatial distribution of the spectral transmittance in accordance with the change in the coordinates, thereby generating sets of image data for each wavelength band.

The processing circuit 200 combines the sets of image data for each wavelength band by averaging, thereby generating output data. With such an operation, noise included in the generated image can be reduced.

Figure 16:
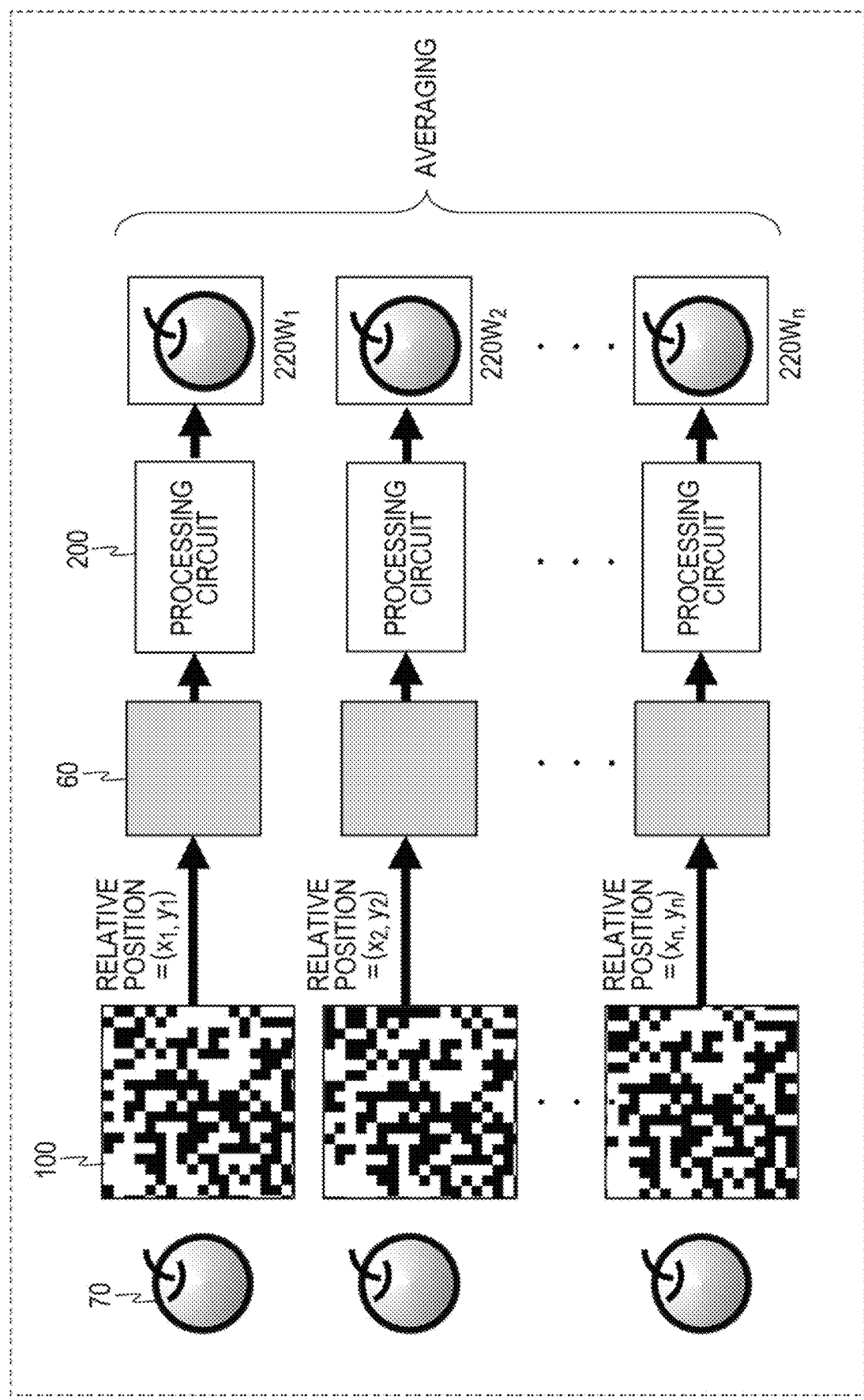
FIG. 16 is a diagram for explaining signal processing according to a fourth embodiment.

FIG. 16 is a diagram for explaining signal processing according to this embodiment. In this embodiment, imaging is performed multiple times while intentionally changing the relative position between the filter array 100 and the image sensor 60 by using one certain filter array 100. As described with reference to FIG. 8A, when the relative position between the filter array 100 and the image sensor 60 changes, the spatial distribution of the spectral transmittance of the filter array 100 changes. Specifically, one certain filter array 100 functions as another filter array 100 having a different spectral transmittance distribution. Thus, in this embodiment, advantages similar to when an image is generated by using n types (n being an integer greater than or equal to 2) of filter arrays 100 having different spectral transmittance distributions are achieved. When n generated images are averaged out, noise added to the generated images is statistically reduced by a factor of $1/\sqrt{n}$.

Figure 17:
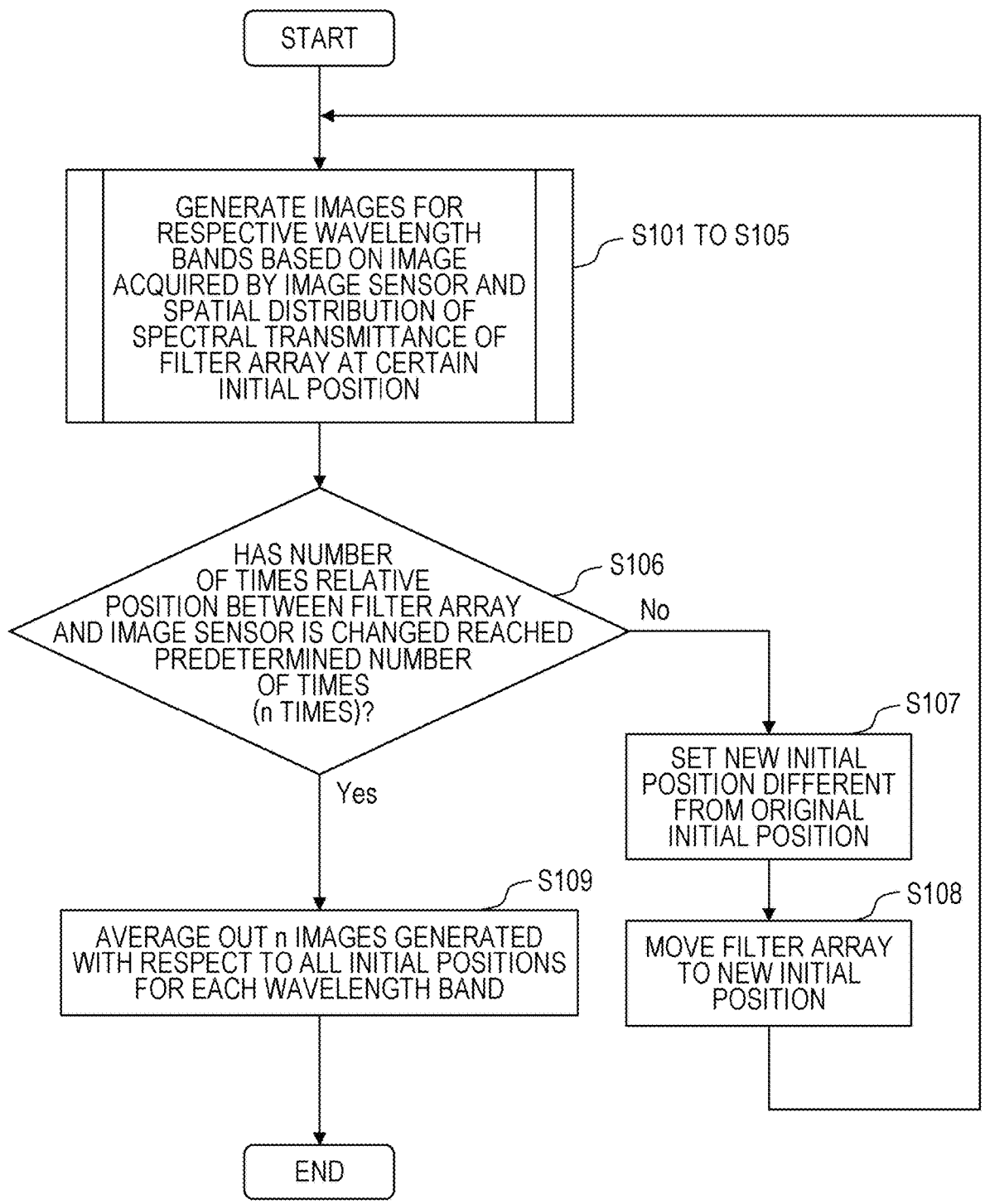
FIG. 17 is a flowchart illustrating an example of the signal processing according to the fourth embodiment.

FIG. 17 is a flowchart illustrating an example of the signal processing according to this embodiment. This example is similar to the first embodiment in that the configuration illustrated in FIG. 5 is used. The processing circuit 200 executes the processes from step S101 to step S105 illustrated in FIG. 10, thereby generating images for the respective wavelength bands in a state where the filter array 100 is located at the initial position. Although the relative-position correction process based on alignment marks is performed in this example, such a correction process may be omitted. In that case, step S102, step S103, and step S104 are omitted, and the filter array 100 does not have to have a characteristic section, such as an alignment mark. Subsequently, in step S106, the processing circuit 200 determines whether the number of times the relative position between the filter array 100 and the image sensor 60 is changed has reached a predetermined number of times (n times). If the determination result indicates No, the processing circuit 200 sets a new initial position different from the original initial position (step S107). For example, a position shifted by a small amount from the original position in a predetermined direction, such as the x direction or the y direction, may be set as the new initial position. The "small amount" may be, for example, about an amount equivalent to one to several pixels of the image sensor 60. Then, the processing circuit 200 controls the movable stage 80 to move the filter array 100 to the newly-set initial position (step S108). Concurrently, the data indicating the spatial distribution of the spectral transmittance used for generating spectral image data is corrected. Subsequently, the processes from step S101 to step S108 are repeated until the determination result in step S106 indicates Yes. In this embodiment, the movement of the filter array 100 in step S108 is based on physical movement. Instead of moving the filter array 100, the image sensor 60 may be moved. Alternatively, instead of physically changing the relative position, the coordinates of the image acquired by the image sensor 60 may be changed. With regard to the correction of the relative position in step S104, either of the physical-movement-based technique and the software-based matrix-correction technique may be used. After repeating the processes from step S101 to step S108 for the predetermined number of times, the processing circuit 200 averages out the n generated images, thereby generating and outputting combined output data (step S109).

According to the above operation, a noise removal process can be performed in accordance with imaging using one certain filter array 100. Consequently, an error in each generated hyperspectral image can be reduced, thereby enhancing the spectral resolution.

The features of each of the first to fourth embodiments described above may be combined with the features of another embodiment so long as there is no contradiction. For example, the mechanical relative-position correction in the first embodiment and the software-based relative-position correction in the second embodiment may be combined. Moreover, the processing according to the fourth embodiment may be applied to the configuration in any one of FIGS. 11 to 13.

What is claimed is:

1. An imaging apparatus comprising:
an image sensor;
a filter array that is disposed on an optical path from a target object to the image sensor and that includes two-dimensionally-arranged optical filters, the optical filters including various types of optical filters with different spectral transmittance; and
a processing circuit that generates at least four pieces of spectral image data based on an image acquired by the image sensor,
wherein each of the at least four pieces of spectral image data indicates an image corresponding to one wavelength band of at least four wavelength bands,
wherein the filter array includes at least one characteristic section, and
wherein the processing circuit detects a relative position between the filter array and the image sensor based on the at least one characteristic section in the image acquired by the image sensor, and compensates for deviation between the relative position and a preliminarily-set relative position when the processing circuit detects the deviation.

2. The imaging apparatus according to claim 1, further comprising:
a first driving device that moves the filter array,
wherein the processing circuit corrects the relative position by controlling the first driving device, so as to compensate for the deviation.

3. The imaging apparatus according to claim 1, further comprising:
a second driving device that moves the image sensor,
wherein the processing circuit corrects the relative position by controlling the second driving device, so as to compensate for the deviation.

4. The imaging apparatus according to claim 1, further comprising:
an optical system that is disposed on an optical path that connects the filter array and the image sensor and that forms an image of light transmitted through the filter array on an imaging surface of the image sensor; and
a third driving device that changes a position of the image formed by the optical system,
wherein the processing circuit corrects the position of the image by controlling the third driving device, so as to compensate for the deviation.

5. The imaging apparatus according to claim 1,
wherein the processing circuit generates the at least four pieces of spectral image data based on the image acquired by the image sensor and data indicating a spatial distribution of the spectral transmittance of the optical filters, and
wherein the processing circuit compensates for the deviation by correcting the data indicating the spatial distribution of the spectral transmittance.

6. The imaging apparatus according to claim 1,
wherein the processing circuit generates the at least four pieces of spectral image data based on the image acquired by the image sensor and data indicating a spatial distribution of the spectral transmittance of the optical filters, and
wherein the processing circuit compensates for the deviation by correcting coordinates of the image acquired by the image sensor.

7. The imaging apparatus according to claim 1,
wherein the at least one characteristic section is one or more alignment marks.

8. The imaging apparatus according to claim 7,
wherein the one or more alignment marks each include a first portion extending in a first direction and a second portion extending in a second direction that intersects the first direction,
wherein the processing circuit detects a tilt of the filter array based on a ratio between a length of the first portion and a length of the second portion in the image acquired by the image sensor, and further executes an operation for reducing an effect of the tilt.

9. The imaging apparatus according to claim 7,
wherein the one or more alignment marks include alignment marks,
wherein the processing circuit detects a tilt of the filter array based on a positional relationship of the alignment marks in the image acquired by the image sensor, and further executes an operation for reducing an effect of the tilt.

10. The imaging apparatus according to claim 7,
wherein the image sensor includes light detection elements each outputting a signal according to intensity of received light,
wherein the processing circuit generates the at least four pieces of spectral image data based on the signal output from a light detection element, included in the light detection elements, receiving light transmitted through a region of the filter array, and
wherein the one or more alignment marks are located outside the region.

11. The imaging apparatus according to claim 7,
wherein the one or more alignment marks are located inside a range capable of being image-captured by the image sensor in a case where the relative position is the preliminarily-set relative position.

12. The imaging apparatus according to claim 7,
wherein the filter array is larger than a range capable of being image-captured by the image sensor in a case where the relative position is the preliminarily-set relative position, and
wherein the one or more alignment marks are located outside the range.

13. An imaging apparatus comprising:
an image sensor;
a filter array that is disposed on an optical path from a target object to the image sensor and that includes two-dimensionally-arranged optical filters, the optical filters including various types of optical filters with different spectral transmittance; and a processing circuit that generates at least four pieces of spectral image data based on an image acquired by the image sensor and data indicating a spatial distribution of the spectral transmittance of the optical filters, wherein each of the at least four pieces of spectral image data indicates an image corresponding to one wavelength band of at least four wavelength bands, wherein the processing circuit executes a first operation including repeating a process for generating the at least four pieces of spectral image data multiple times while changing a relative position between the filter array and the image sensor so as to generate sets of the at least four pieces of spectral image data, or a second operation including repeating a process for generating the at least four pieces of spectral image data multiple times while changing coordinates of the image acquired by the image sensor so as to generate sets of the at least four pieces of spectral image data, and wherein the processing circuit combines the sets of the at least four pieces of spectral image data so as to generate output data.

14. The imaging apparatus according to claim 13, wherein the first operation includes correcting the data indicating the spatial distribution of the spectral transmittance in accordance with a change in the relative position.

15. The imaging apparatus according to according to claim 13, wherein the second operation includes correcting the data indicating the spatial distribution of the spectral transmittance in accordance with a change in the coordinates.

* * * * *